(12) United States Patent
Fukuda et al.

(10) Patent No.: US 12,293,585 B2
(45) Date of Patent: May 6, 2025

(54) INFORMATION PROCESSING APPARATUS, INFORMATION PROCESSING METHOD, AND STORAGE MEDIUM

(71) Applicant: NEC Corporation, Tokyo (JP)

(72) Inventors: Junichi Fukuda, Tokyo (JP); Hajime Yamashita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 332 days.

(21) Appl. No.: 17/794,376

(22) PCT Filed: Jan. 31, 2020

(86) PCT No.: PCT/JP2020/003741
§ 371 (c)(1),
(2) Date: Jul. 21, 2022

(87) PCT Pub. No.: WO2021/152836
PCT Pub. Date: Aug. 5, 2021

(65) Prior Publication Data
US 2023/0052278 A1 Feb. 16, 2023

(51) Int. Cl.
*G06V 20/52* (2022.01)
*G06V 20/40* (2022.01)
*G06V 40/16* (2022.01)
*H04N 5/265* (2006.01)
*H04N 7/18* (2006.01)

(52) U.S. Cl.
CPC ............ *G06V 20/52* (2022.01); *G06V 20/41* (2022.01); *G06V 20/48* (2022.01); *G06V 40/161* (2022.01); *H04N 5/265* (2013.01); *H04N 7/181* (2013.01); *G06V 2201/07* (2022.01)

(58) Field of Classification Search
None
See application file for complete search history.

(56) References Cited

U.S. PATENT DOCUMENTS

| | | | |
|---|---|---|---|
| 6,741,276 B1 | 5/2004 | Yonezawa et al. | |
| 2002/0111939 A1 | 8/2002 | Kondo et al. | |
| 2003/0202101 A1* | 10/2003 | Monroe | G08B 13/19695 |
| | | | 348/E7.086 |

(Continued)

FOREIGN PATENT DOCUMENTS

| | | |
|---|---|---|
| JP | H07-244695 A | 9/1995 |
| JP | 2000-050243 A | 2/2000 |

(Continued)

OTHER PUBLICATIONS

International Search Report for PCT Application No. PCT/JP2020/003741, mailed on Mar. 31, 2020.

*Primary Examiner* — Jiangeng Sun

(57) ABSTRACT

An information processing apparatus according to the present invention includes: a display control unit that displays, on a screen, a map of a search area, a camera icon indicating a location of a surveillance camera in the map, and a person image of a search target person; an operation receiving unit that receives an operation of superimposing, on the screen, one of the person image or the camera icon on the other; and a processing request unit that requests a matching process between the person image and a surveillance video captured by the surveillance camera corresponding to the camera icon based on the operation.

18 Claims, 25 Drawing Sheets

(56) References Cited

U.S. PATENT DOCUMENTS

| | | | | |
|---|---|---|---|---|
| 2004/0117638 A1* | 6/2004 | Monroe | ............... | G08B 25/016 |
| | | | | 713/186 |
| 2012/0321145 A1 | 12/2012 | Saito et al. | | |
| 2013/0091432 A1* | 4/2013 | Shet | ........................ | G06F 16/73 |
| | | | | 715/719 |
| 2013/0198224 A1* | 8/2013 | Sharma | ............. | G06F 16/90328 |
| | | | | 707/769 |
| 2016/0134843 A1* | 5/2016 | Torrione | ................ | H04N 7/181 |
| | | | | 348/159 |
| 2018/0139416 A1 | 5/2018 | Hirasawa et al. | | |
| 2018/0253603 A1* | 9/2018 | Yamamoto | ............. | G06V 20/52 |

FOREIGN PATENT DOCUMENTS

| | | | |
|---|---|---|---|
| JP | 2002-207741 A | | 7/2002 |
| JP | 2006-094293 A | | 4/2006 |
| JP | 2013-003964 A | | 1/2013 |
| JP | 2014-049865 A | | 3/2014 |
| JP | 2015-220549 A | | 12/2015 |
| JP | 2016009278 A | * | 1/2016 |
| JP | 2018-195992 A | | 12/2018 |
| JP | 6573346 B1 | | 9/2019 |
| WO | 2016/189782 A1 | | 12/2016 |

\* cited by examiner

FIG. 2

REGISTRANT INFORMATION

| No | ITEM NAME |
|---|---|
| 1 | REGISTRANT ID |
| 2 | REGISTERED FACE IMAGE |
| 3 | FACE FEATURE AMOUNT |
| 4 | NAME |
| 5 | GENDER |
| 6 | AGE |
| 7 | REGISTRATION DATE AND TIME |
| 8 | REASON FOR REGISTRATION |

FIG. 3

VIDEO INFORMATION

| No | ITEM NAME |
|---|---|
| 1 | VIDEO ID |
| 2 | FILE NAME |
| 3 | FILE SAVE LOCATION |
| 4 | CAMERA ID |
| 5 | LOCATION OF CAPTURING |
| 6 | START DATE AND TIME OF CAPTURING |
| 7 | END DATE AND TIME OF CAPTURING |
| 8 | REGISTRATION DATE AND TIME IN DATABASE |
| 9 | FRAME RATE |

FIG. 4

CAMERA INFORMATION

| No | ITEM NAME |
|---|---|
| 1 | CAMERA ID |
| 2 | LOCATION INFORMATION |
| 3 | DIRECTION OF CAPTURING |
| 4 | CAMERA TYPE |

FIG. 5

DETECTION HISTORY INFORMATION

| No | ITEM NAME |
|---|---|
| 1 | DETECTION SEQ |
| 2 | DETECTED FACE IMAGE |
| 3 | FACE FEATURE AMOUNT |
| 4 | VIDEO ID |
| 5 | CAMERA ID |
| 6 | DETECTION TIME |
| 7 | REGISTRANT ID |

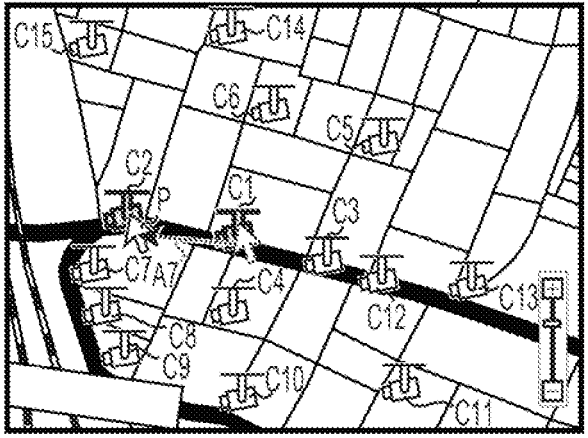

INFORMATION PROCESSING APPARATUS, INFORMATION PROCESSING METHOD, AND STORAGE MEDIUM

This application is a National Stage Entry of PCT/JP2020/003741 filed on Jan. 31, 2020, the contents of all of which are incorporated herein by reference, in their entirety.

TECHNICAL FIELD

The present invention relates to an information processing apparatus, an information processing method, and a storage medium.

BACKGROUND ART

Patent Literature 1 discloses a person search system which displays an image list of persons detected from a video captured by a camera selected from a plurality of cameras based on a user operation, sets videos captured by cameras excluding the camera which captured the person image of the target person selected from the image list as a search target, and searches the target person by an image matching of the person image.

CITATION LIST

Patent Literature

PTL 1: Japanese Patent No. 65733461

SUMMARY OF INVENTION

Technical Problem

However, in the person search system exemplified in Patent Literature 1, when the user selects the person image of the target person from the image list, the user is not allowed to freely specify a camera to be searched.

In view of the above problem, an object of the present invention is to provide an information processing apparatus, an information processing method, and a storage medium capable of allowing a user to easily search a target person from surveillance videos captured by the desired surveillance camera.

Solution to Problem

According to one aspect of the present invention, there is provided an information processing apparatus including: a display control unit that displays, on a screen, a map of a search area, a camera icon indicating a location of a surveillance camera in the map, and a person image of a search target person; an operation receiving unit that receives an operation of superimposing, on the screen, one of the person image or the camera icon on the other; and a processing request unit that requests a matching process between the person image and a surveillance video captured by the surveillance camera corresponding to the camera icon based on the operation.

According to another aspect of the present invention, there is provided an information processing method including: displaying, on a screen, a map of a search area, a camera icon indicating a location of a surveillance camera in the map, and a person image of a search target person; receiving an operation of superimposing, on the screen, one of the person image or the camera icon on the other; and requesting a matching process between the person image and a surveillance video captured by the surveillance camera corresponding to the camera icon based on the operation.

According to yet another aspect of the present invention, there is provided a storage medium storing a program that causes a computer to execute: displaying, on a screen, a map of a search area, a camera icon indicating a location of a surveillance camera in the map, and a person image of a search target person; receiving an operation of superimposing, on the screen, one of the person image or the camera icon on the other; and requesting a matching process between the person image and a surveillance video captured by the surveillance camera corresponding to the camera icon based on the operation.

Advantageous Effects of Invention

According to the present invention, it is possible to provide an information processing apparatus, an information processing method, and a storage medium capable of allowing a user to easily search a target person from surveillance videos captured by the desired surveillance camera.

BRIEF DESCRIPTION OF DRAWINGS

FIG. 2 is a diagram illustrating an example of information stored in a registrant information database according to the first example embodiment.

FIG. 3 is a diagram illustrating an example of information stored in a video information database according to the first example embodiment.

FIG. 4 is a diagram illustrating an example of information stored in a camera information database according to the first example embodiment.

FIG. 5 is a diagram illustrating an example of information stored in a detection history information database according to the first example embodiment.

FIG. 25 is a diagram illustrating an example of search results according to the second example embodiment.

FIG. 26 is a diagram illustrating an example of a search screen according to a third example embodiment.

FIG. 29 illustrates an example of a search screen related to a fifth search operation.

FIG. 30 illustrates an example of search results related to the fifth search operation.

FIG. 33 illustrates an example of a search screen related to a sixth search operation.

FIG. 34 illustrates an example of search results related to the sixth search operation.

FIG. 39 illustrates an example of a search screen according to the modified example embodiment.

FIG. 40 illustrates an example of a search screen according to the modified example embodiment.

DESCRIPTION OF EMBODIMENTS

Exemplary example embodiments of the present invention will be described below with reference to the drawings. Throughout the drawings, the same elements or corresponding elements are labeled with the same references, and the description thereof may be omitted or simplified.

First Example Embodiment

Figure 1:
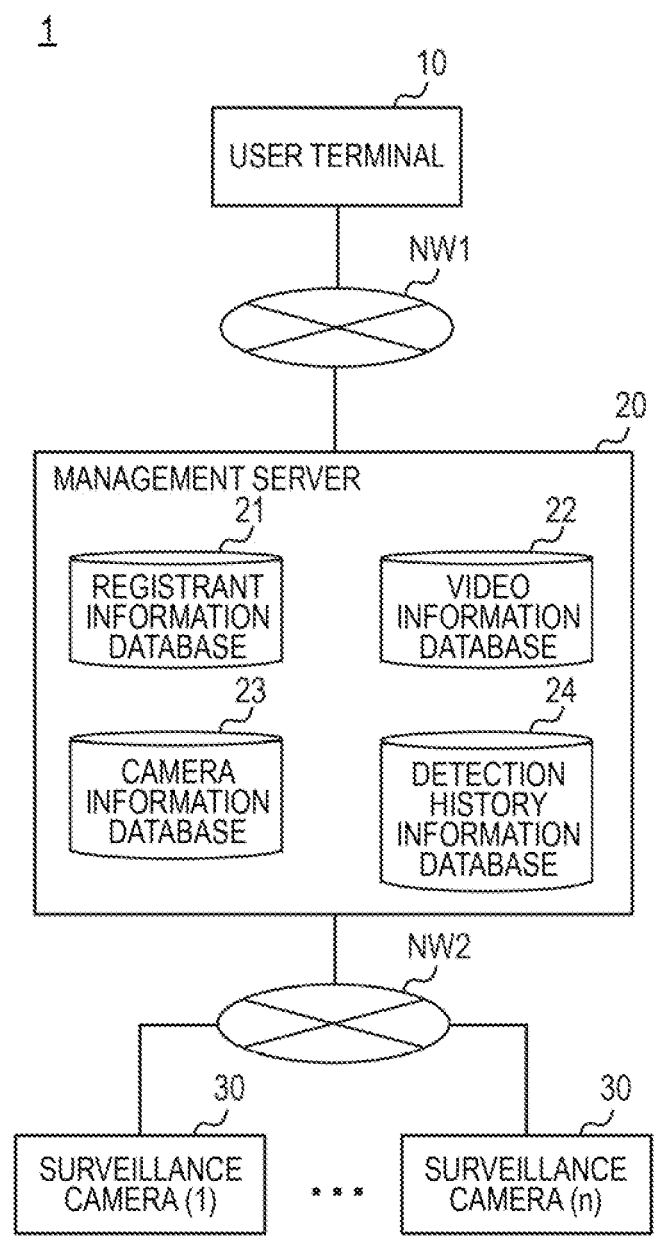
FIG. 1 is a block diagram illustrating an example of the overall configuration of a person search system according to a first example embodiment.

FIG. 1 is a block diagram illustrating an example of the overall configuration of a person search system 1 according to the present example embodiment. The person search system 1 is a computer system that performs matching between a person (Hereinafter referred to as a "Target Person".) specified as a search target by a user in a user terminal 10 and an image stored in a management server 20 to search the target person from a surveillance video.

As illustrated in FIG. 1, the person search system 1 includes the user terminal 10, a management server 20, and a surveillance camera 30. The user terminal 10, the management server 20, and the surveillance camera 30 are connected via a network NW1 and a network NW2 such as the Internet and a Local Area Network (LAN). According to the present example embodiment, although the network NW1 and network NW2 are different networks, they may be configured as the same network.

The user terminal 10 is a terminal used by the user of this system for various input operations such as specifying a target person, specifying a surveillance camera 30 corresponding to a video to be searched, and specifying a search condition. The user terminal 10 is, for example, a laptop computer, a desktop computer, a tablet terminal, a smartphone, and the like. When receiving an input operation from the user, the user terminal 10 requests execution of prescribed process to the management server 20 based on the input information.

The management server 20 is a device that manages videos captured by the surveillance camera 30, performs image analysis process, performs image matching process, and manages the biometric information of the registrant and the detected person. The management server 20 is, for example, a server computer.

The surveillance camera 30 is a capturing device such as a digital video camera or an infrared camera. The type of the surveillance camera 30 may be appropriately selected according to the surveillance target and the installation environment. The surveillance camera 30 may be installed in any location such as a residential area, a downtown area, a transportation facility, a financial institution, a factory, an office building, a theme park, an event venue, etc.

As illustrated in FIG. 1, the management server 20 includes a registrant information database 21, a video information database 22, a camera information database 23, and a detection history information database 24. However, the databases provided in the management server 20 are not limited to these databases.

FIG. 2 is a diagram illustrating an example of information stored in the registrant information database 21 according to the present example embodiment. Data items of registrant information include a registrant ID, a registered face image, a face feature amount, a name, a gender, an age, a registration date and time, and a reason for registration. However, the data items are not limited to these. According to the present example embodiment, a "registrant" means a person who is registered in various lists such as VIP list, blacklist, customer list, etc. The reason for registration is an explanation of a reason why the person is registered in the registrant information database 21. For example, when the registrant information is a blacklist for registering a person requiring attention, a detailed reason thereof is recorded.

FIG. 3 is a diagram illustrating an example of information stored in the video information database 22 according to the present example embodiment. The data items of the video information include a video ID unique to each piece of video data, a file name, a file save location, a camera ID of the surveillance camera 30 that captured the video, a location of capturing, a start date and time of capturing, an end date and time of capturing, a registration date and time in database, and a frame rate. However, the data items are not limited to these.

FIG. 4 is a diagram illustrating an example of information stored in the camera information database 23 according to the present example embodiment. The data items of the camera information include a camera ID unique to each surveillance camera 30, location information indicating the location of the surveillance camera 30, a direction of capturing in the surveillance camera 30, and a camera type. However, the data items are not limited to these.

FIG. 5 is a diagram illustrating an example of information stored in the detection history information database 24 according to the present example embodiment. The data items of the detection history information include a detection SEQ, the detected face image, the face feature amount, the video ID for identifying the image of the detection source, the camera ID, the detection time, and the registrant ID. However, the data items are not limited to these. The detection SEQ is a unique number newly issued each time a person is detected. The detection time is a time stamp of a display frame in which a face image is detected.

Figure 6:
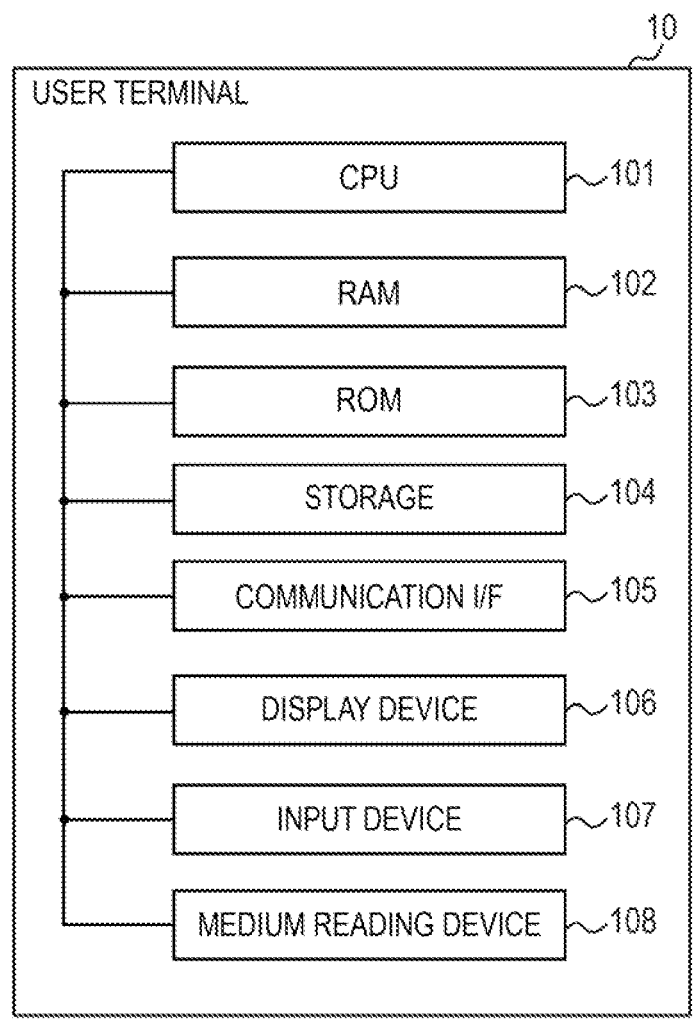
FIG. 6 is a block diagram illustrating an example of a hardware configuration of a user terminal according to the first example embodiment.

FIG. 6 is a block diagram illustrating an example of the hardware configuration of the user terminal 10 according to the present example embodiment. As illustrated in FIG. 6, the user terminal 10 includes a Central Processing Unit (CPU) 101, a Random Access Memory (RAM) 102, a Read Only Memory (ROM) 103, a storage 104, a communication interface (I/F) 105, a display device 106, an input device 107, and a medium reading device 108 as computers that perform calculations, control, and storage. The devices are connected to each other via a bus, wiring, a driving device, etc.

The CPU 101 is a processor having a function of performing a predetermined operation related to a program stored in the ROM 103 or the storage 104 and controlling each part of the user terminal 10. The RAM 102 comprises a volatile storage medium and provides a temporary memory area necessary for the operation of the CPU 101.

The ROM 103 is composed of a nonvolatile storage medium and stores necessary information such as a program used for operation of the user terminal 10. The storage 104 is composed of a nonvolatile storage medium, and stores programs and data for operation of the user terminal 10. The storage 104 comprises, for example, a Hard Disk Drive (HDD) or Solid State Drive (SSD).

The communication I/F 105 is a communication interface based on standards such as Ethernet (Registered trademark), Wi-Fi (Registered trademark), and 4G, and is a module for communicating with other devices.

The display device 106 is a liquid crystal display, Organic Light Emitting Diode (OLED) display, and the like for displaying moving images, still images, persons, and the like, and is used for presenting information to the user.

The input device 107 is a keyboard, a pointing device, a button, etc., and receives an operation by the user. The display device 106 and the input device 107 may be integrally formed as a touch panel.

The medium reading device 108 reads video data and still image data recorded on a recording medium. Examples of the recording medium include a DVD disc, a Blu-Ray (Registered trademark) disc, a magnetic tape, a flash memory, and a smartphone. The medium reading device 108 includes, for example, a disk drive, a card reader, an image scanner, and the like.

Figure 7:
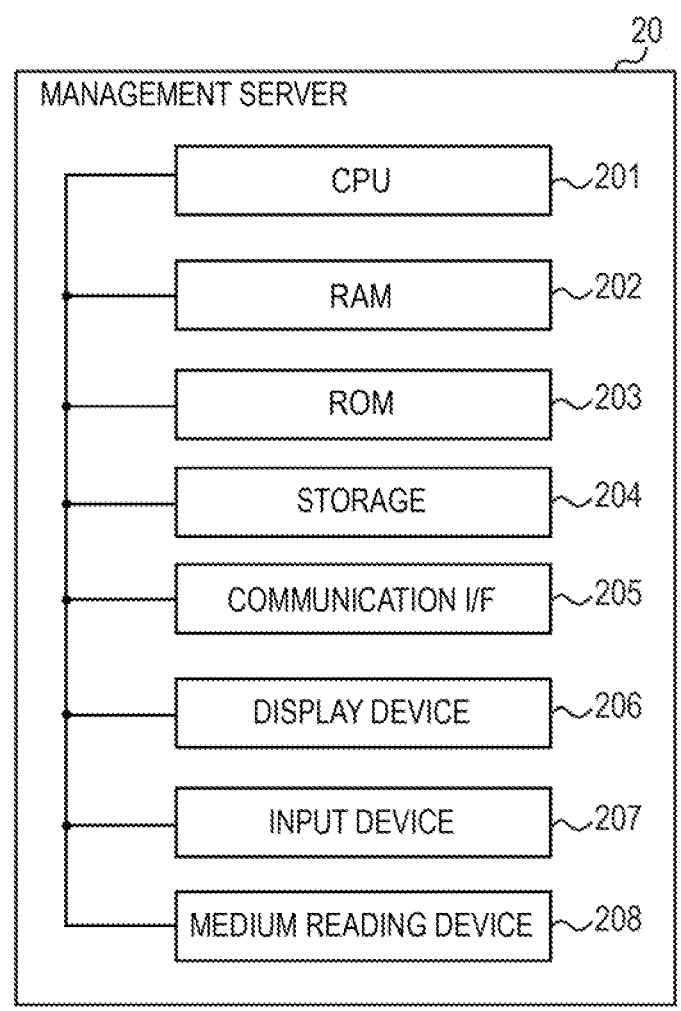
FIG. 7 is a block diagram illustrating an example of a hardware configuration of a management server according to the first example embodiment.

FIG. 7 is a block diagram illustrating an example of the hardware configuration of the management server 20 according to the present example embodiment. As illustrated in FIG. 7, the management server 20 includes a CPU 201, a RAM 202, a ROM 203, a storage 204, a communication interface (I/F) 205, a display device 206, an input device 207, and a medium reading device 208 as computers that perform calculations, control, and storage. The devices are connected to each other via a bus, wiring, a driving device, etc.

The hardware configuration illustrated in FIGS. 6 and 7 is an example, and other devices may be added or some devices may not be provided. Some devices may be replaced by other devices having similar functions. Also, some of the functions of the present example embodiment may be provided by other devices via a network, and the functions of the present example embodiment may be implemented by being distributed among a plurality of devices. As described above, the hardware configuration illustrated in FIGS. 6 and 7 can be changed appropriately.

Next, the operation of the person search system 1 according to the present example embodiment will be described with reference to FIGS. 8 to 23.

<Person Detection Process>

Figure 8:
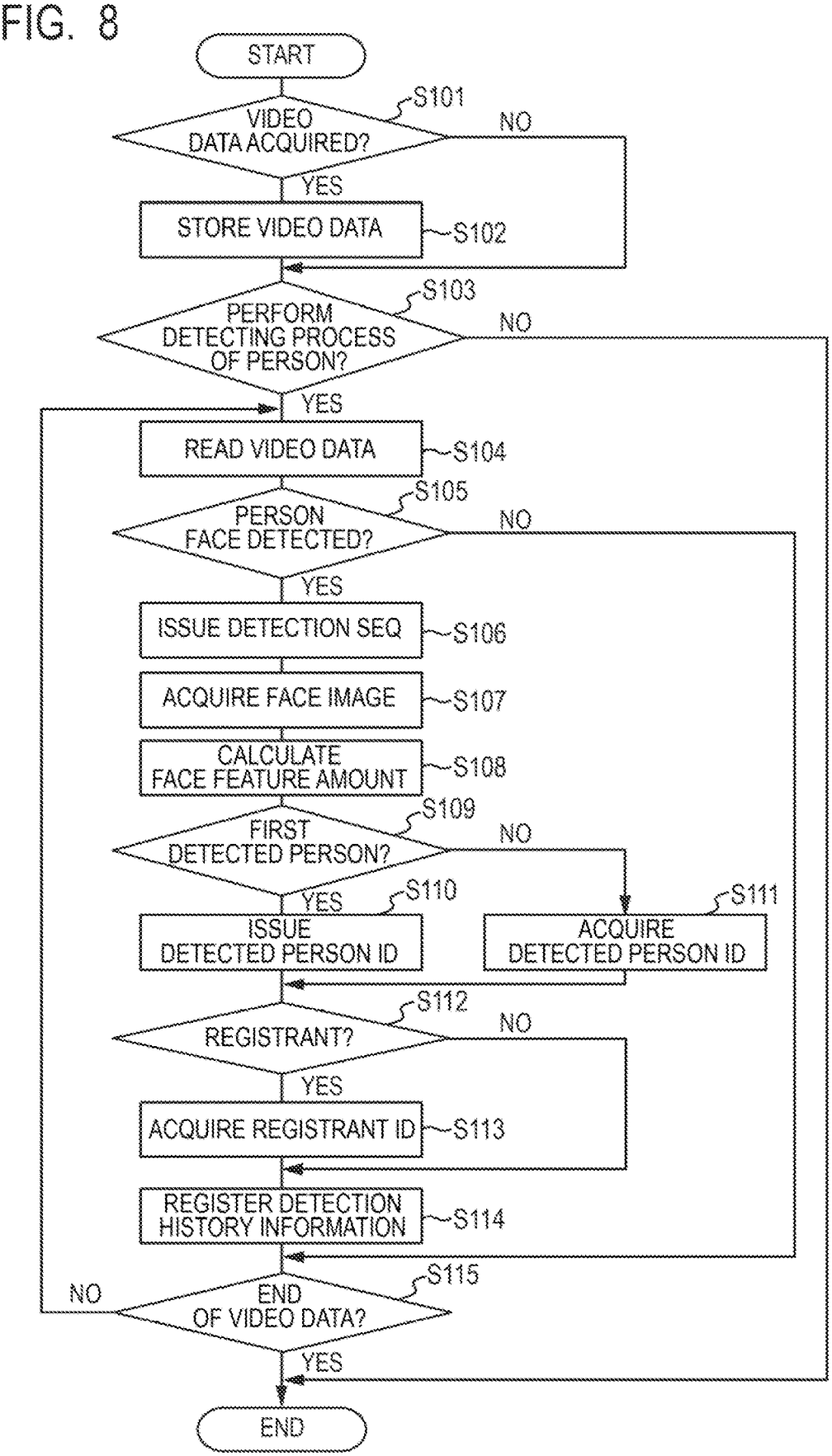
FIG. 8 is a flowchart illustrating an example of the management server process according to the first example embodiment.

FIG. 8 is a flowchart illustrating an example of process by the management server 20 according to the present example embodiment. This process is performed when the management server 20 detects a person shown in a video captured by the surveillance camera 30 and registers the face image of the detected person in the detection history information database 24 in a searchable state.

In step S101, the management server 20 determines whether video data has been acquired from the surveillance camera 30 or the medium reading device 208. If the management server 20 determines that the video data has been acquired (step S101: YES), the process proceeds to step S102.

On the other hand, if the management server 20 determines that the video data has not been acquired (step S101: NO), the process proceeds to step S103.

In step S102, the management server 20 stores the video data in the storage 204. At this time, the management server 20 issues a unique video ID to the video data and registers the video information including the video ID in the video information database 22.

In step S103, the management server 20 determines whether to perform the person detection process for the video data stored in the storage 204. If the management server 20 determines that the person detection process is to be performed (step S103: YES), the process proceeds to step S104.

On the other hand, if the management server 20 determines that the person detection process is not to be performed (step S103: NO), the process of FIG. 8 ends.

In step S104, the management server 20 reads in the RAM 202 the video data in which the person detection process has not been performed yet among the video data stored in the storage 204.

In step S105, the management server 20 determines whether or not a face of a person is detected from the video data. If the management server 20 determines that the person face has been detected (step S105: YES), the process proceeds to step S106.

On the other hand, if the management server 20 determines that person face has not detected (step S105: NO), the process proceeds to step S115.

In step S106, the management server 20 issues a detection SEQ along with the detection of the face image. Next, if the management server 20 acquires a face image from the video data (step S107), the management server 20 calculates a face feature amount from the face image (step S108).

In step S109, the management server 20 determines whether the detected face image is an image of a person detected for the first time. For example, the management server 20 can determine whether or not a face image is registered by searching the detection history information database 24 based on the face feature amount.

If the management server 20 determines that the image is a face image of the person detected for the first time (step S109: YES), the process proceeds to step S110. On the other hand, if the management server 20 determines that the image is a face image of the person that has already been detected (step S109: NO), the process proceeds to step S111.

In step S110, the management server 20 issues a detected person ID unique to the person (Hereinafter referred to as a "detected person".) who is detected. According to the present example embodiment, it is assumed that the detected person ID is common among a plurality of videos. On the other hand, in step S111, the management server 20 acquires the detected person ID from the detection history information database 24 using, for example, the face feature amount as a key.

In step S112, the management server 20 determines whether or not the detected person is a registrant in the registrant information database 21. For example, if the registrant ID is associated with the detected person ID in the detection history information database 24, the management server 20 can determine that the detected person is the registrant. The management server 20 may determine whether or not the detected person is the registrant by searching the registrant information database 21 based on the face feature amount.

If the management server 20 determines that the detected person is the registrant (step S112: YES), the process proceeds to step S113. On the other hand, if the management server 20 determines that the detected person is not the registrant (step S112: NO), the process proceeds to step S114.

In step S113, the management server 20 acquires a registrant ID related to the detected person from the registrant information database 21.

In step S114, the management server 20 creates detection history information related to the detected person and registers the detection history information in the detection history information database 24.

In step S115, the management server 20 determines whether or not the video data has ended. If the management server 20 determines that the video data has ended (step S115: YES), the process of FIG. 8 ends.

On the other hand, if the management server 20 determines that the video data has not ended (step S115: NO), the process returns to step S104.

<Search Process of Target Person>

Next, a description will be given of a search process of a target person in the person search system 1. The present example embodiment exemplifies four operations in which the user specifies a target person for a tracking operation. However, the number of operations for searching person is not limited four.

(First Search Operation)

Figure 9:
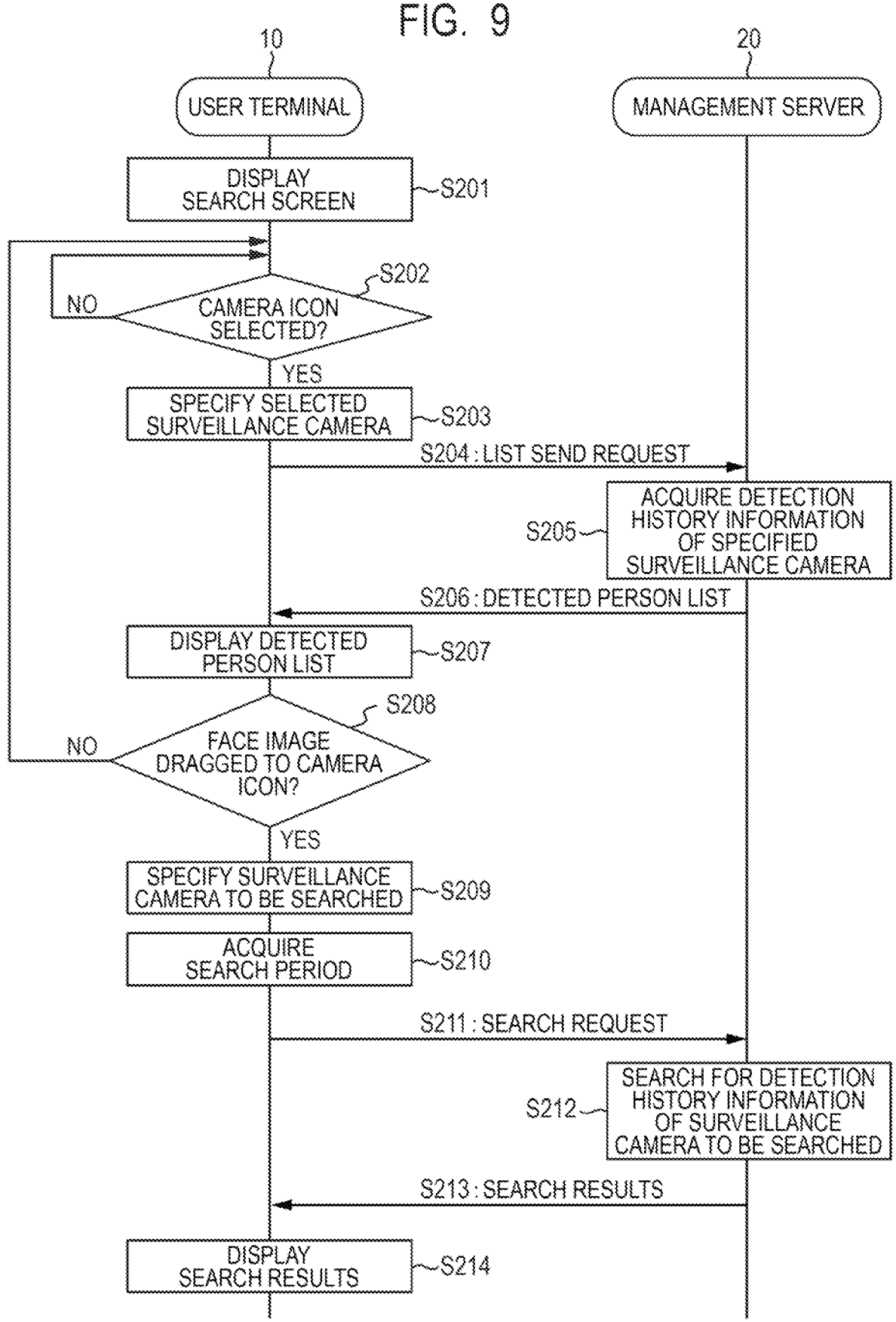
FIG. 9 is a sequence diagram illustrating an example of process of a person search system according to the first example embodiment.

FIG. 9 is a sequence diagram illustrating an example of process in the person search system 1 according to the present example embodiment. This process is related to a first search operation performed when the user selects an image of a target person from a detected person list.

Figure 10:
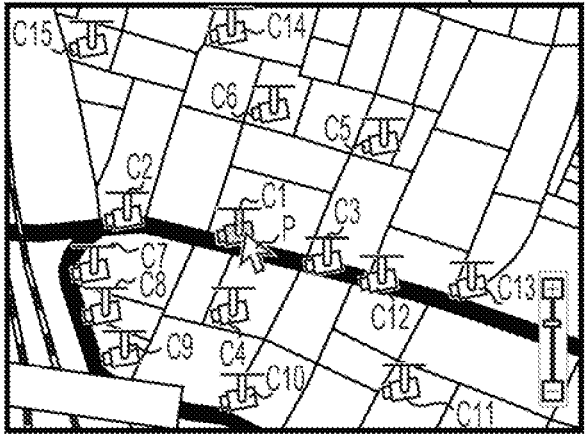
FIG. 10 illustrates an example of a search screen related to a first search operation.

In step S201, the user terminal 10 displays a search screen on the display device 106. FIG. 10 is a diagram illustrating an example of a search screen related to the first search operation. In this case, an input field for the search period, an input field for searching and specifying the search area, and a display field of the map M1 indicating the search area are provided in the left-side area of the search screen in order from the top.

Three tabs T1 to T3 are provided on the right-side area of the search screen for selecting a search operation. In the screen, a tab T1 of the "detected person list" is selected, and the tab T1 displays the guide information "Please select the camera icon on the map. Persons captured by the specified camera during the search period are displayed in a list format." related to the search operation.

In step S202, the user terminal 10 determines whether or not the camera icon has been selected on the map. If the user terminal 10 determines that the camera icon has been selected (step S202: YES), the process proceeds to step S203.

On the other hand, if the user terminal 10 determines that the camera icon has not been selected on the map (step S202: NO), the process of step S202 is repeated.

In step S203, the user terminal 10 specifies the surveillance camera 30 corresponding to the camera icon specified by the user and acquires the camera ID. In the example of FIG. 10, the camera icon selected by the operation of the mouse pointer P is the camera icon C1. Hereinafter, the code attached to the camera icon is assumed to be the same as the camera ID of the surveillance camera 30 corresponding to the camera icon.

In step S204, the user terminal 10 requests the management server 20 to send the detected person list of the specified surveillance camera 30. The send request includes the camera ID of the specified surveillance camera 30.

In step S205, the management server 20 refers to the detection history information database 24 using the camera ID included in the send request received from the user terminal 10 as a key, and acquires detection history information related to the specified surveillance camera 30. When the search period is specified on the search screen, only the detection history information whose detection time is included in the search period can be extracted.

In step S206, the management server 20 sends to the user terminal 10 the detected person list created based on the detected history information related to the specified surveillance camera 30. Next, the user terminal 10 displays the detected person list received from the management server 20 on the search screen (step S207).

Figure 11:
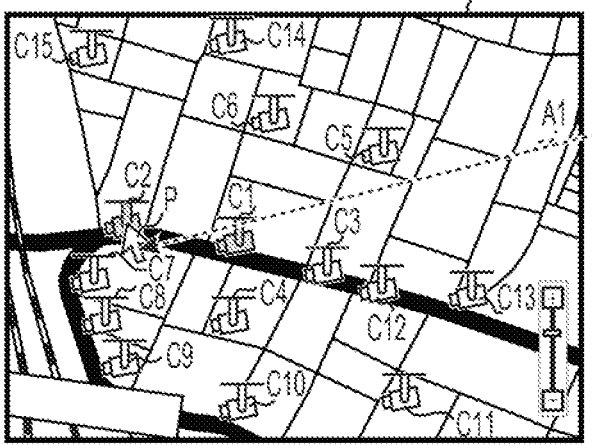
FIG. 11 illustrates an example of a search screen related to the first search operation.

FIG. 11 is a diagram illustrating an example of a search screen related to the first search operation. Here, in the tab T1 of the search screen, a detected person list LS1 related to a video captured by the surveillance camera 30 having the camera ID of "C1" is displayed. As the data items of the detected person list LS1, a face image of the detected person, a detection date and time, a registered face image, detailed information, and an alert are presented. However, the data items of the detected person list LS1 are not limited to these. The registered face image is displayed when the detected person is registered as the registrant in the registrant information database 21. Further, for example, when the reason for registration related to the registrant is "a person requiring attention" and the like, it is preferable that a graphic and the like for calling attention is displayed in the data column of the alert.

A broken line arrow A1 in FIG. 11 indicates that the user has performed an operation (Hereinafter referred to as a "drag operation" or a "drag".) of superimposing the face image in the detected person list LS1 with the mouse pointer P on another surveillance camera 30 (camera ID: C2) displayed on the map M1.

In step S208, the user terminal 10 determines whether or not the face image in the detected person list has been dragged to the camera icon on the map. If the user terminal 10 determines that the face image has been dragged to the camera icon on the map (step S208: YES), the process proceeds to step S209.

On the other hand, if the user terminal 10 determines that the face image has not been dragged to the camera icon on the map (step S208: NO), the process returns to step S202.

In step S209, the user terminal 10 specifies the destination in the drag operation of the face image, the user terminal 10 specifies the surveillance camera 30 corresponding to the camera icon to be searched, and acquires its camera ID. In the example of FIG. 11, the camera ID of the surveillance camera 30 corresponding to the camera icon as the destination in the drag operation is "C2".

In step S210, the user terminal 10 acquires the search period specified on the search screen by the user. In the example of FIG. 11, "2019/12/31 12:00" to "2019/12/31 14:00" is specified as the search period.

In step S211, the user terminal 10 sends a search request of the target person to the management server 20. The search request includes information such as the face image of the target person, the detected person ID, the search period, and the camera ID of the surveillance camera 30 to be searched.

In step S212, the management server 20 searches for the detection history information related to the surveillance camera 30 to be searched based on the face image included in the search request received from the user terminal 10.

In step S213, the management server 20 sends the search results to the user terminal 10. The search results include, for example, the video ID for identifying video data in which the target person is shown and information on the date and time of capturing the target person.

Figure 12:
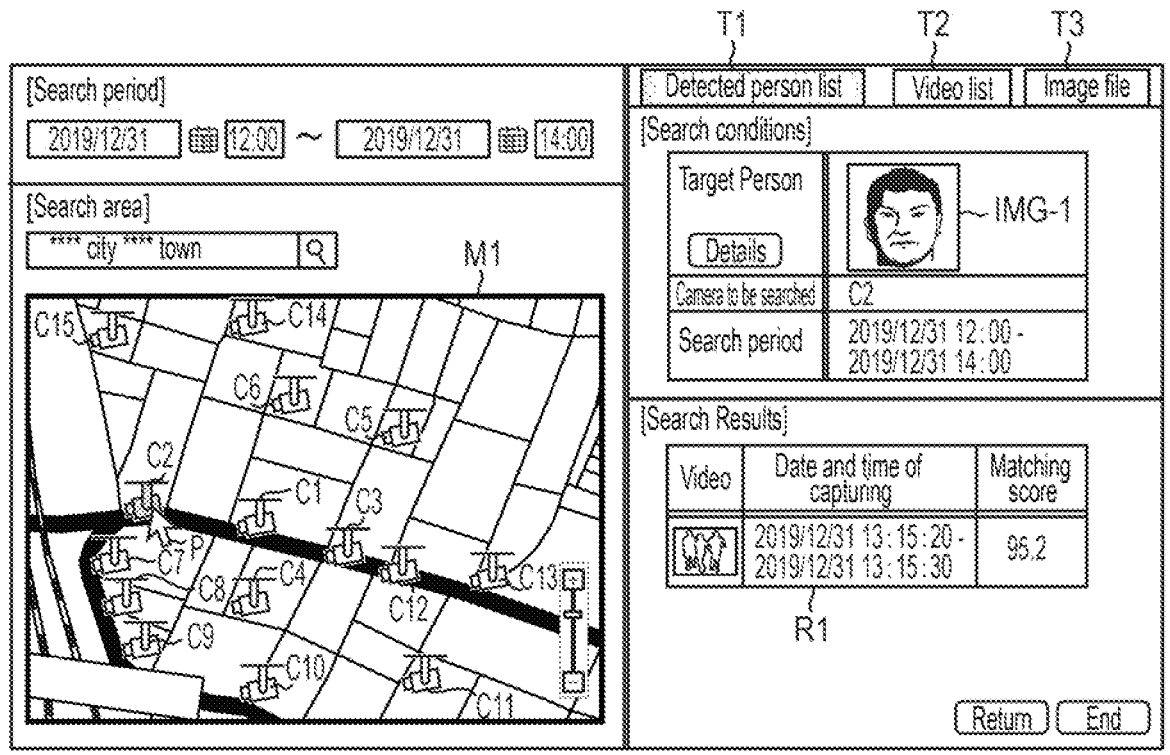
FIG. 12 illustrates an example of search results related to the first search operation.

In step S214, the user terminal 10 displays the search results on the display device 106. FIG. 12 is a diagram illustrating an example of search results related to the first search operation. In FIG. 12, the tab T1 of the search screen displays search conditions (face image (IMG-1) of the target person, camera to be searched (C2), search period) specified by the user and search results R1 (video/date and time of capturing (2019/12/31 13:15:20-2019/12/31 13:15:30)/ matching score (95.2)).

Figure 13:
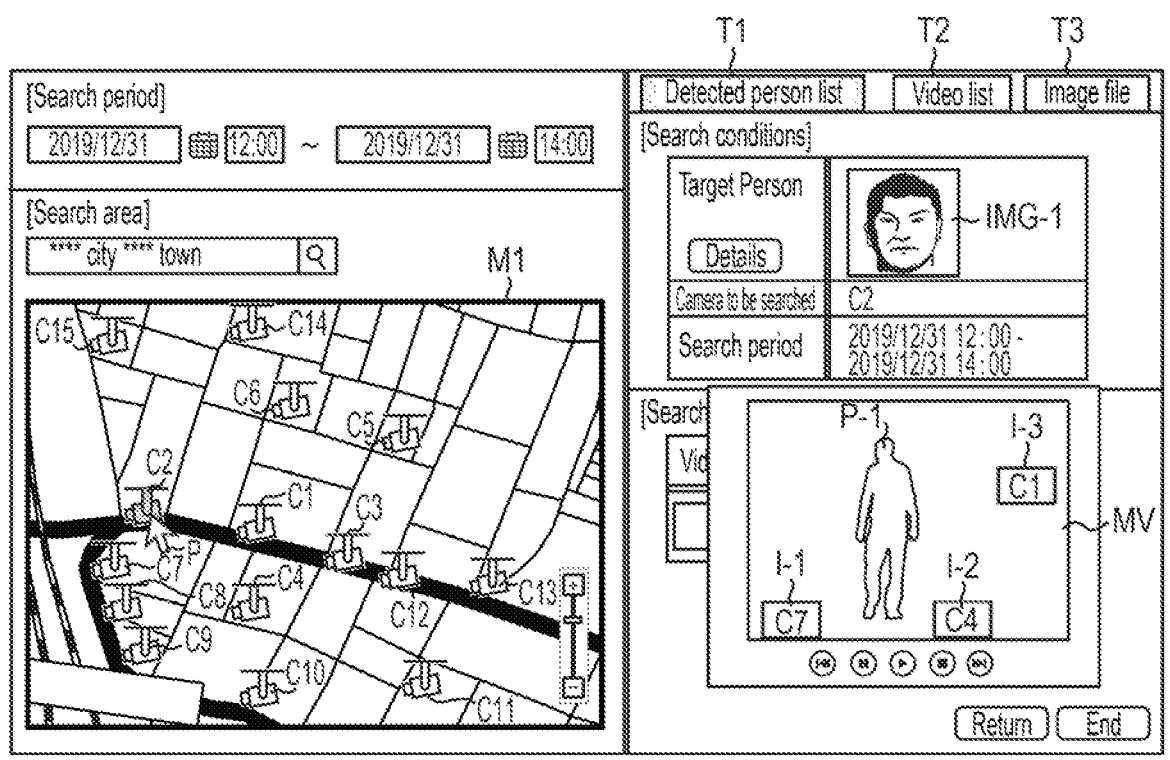
FIG. 13 illustrates an example of search results related to the first search operation.
Figure 14:
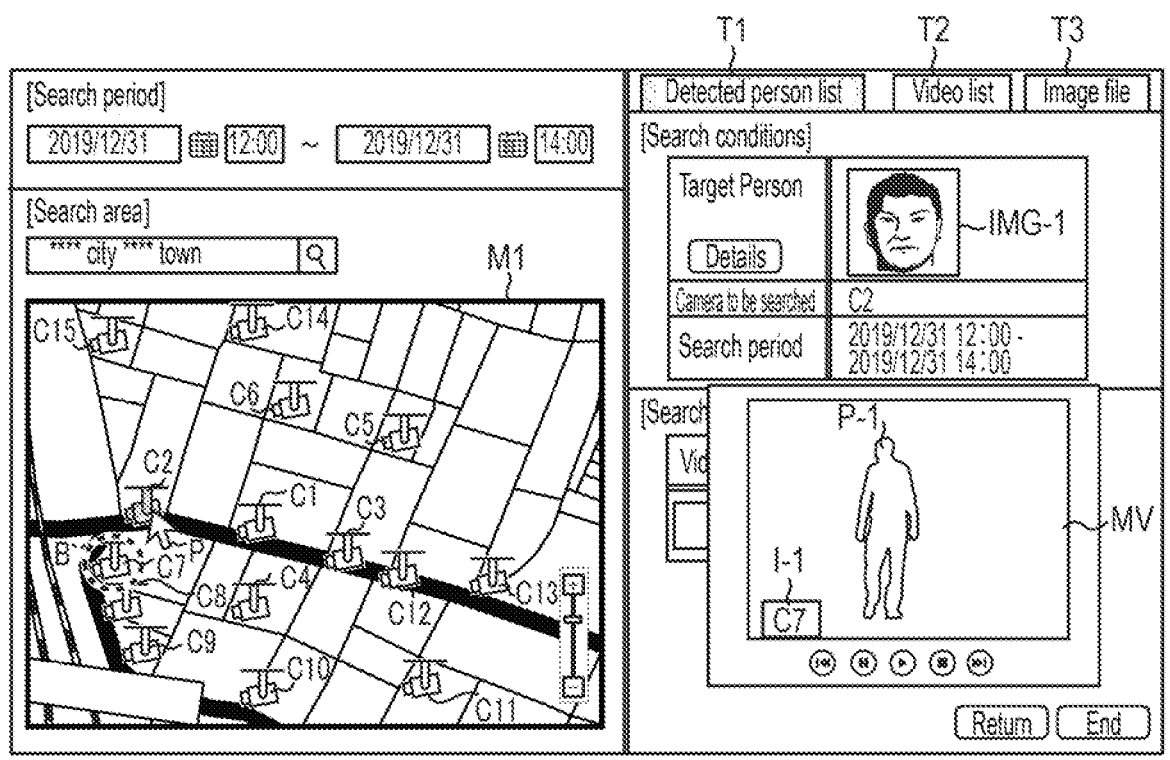
FIG. 14 illustrates an example of search results related to the first search operation.

The information displayed as the search results may have various variations. FIGS. 13 and 14 are diagrams illustrating an example of the search results related to the first search operation. In the example of FIG. 13, a screen for replaying the extracted video MV in which the target person P-1 is shown is superimposed and displayed on the search screen. In the extracted video MV, icons I-1 to I-3 are superimposed and displayed around the target person P-1 as signs indicating the direction to the location of the surveillance camera 30 different from the surveillance camera 30 which captured the extracted video MV and its the camera ID.

Further, it is preferable that the user specifies the face portion of the target person P-1 on the screen and performs a drag operation for superimposing the face portion on the icon in the extracted video MV to request matching process between the face image of the target person P-1 and videos captured by cameras (camera ID: C1/C4/C7) other than the surveillance camera 30 related to the extracted video MV. Thus, the user can efficiently track the target person P-1.

In FIG. 14, unlike in the case of FIG. 13, only an icon (camera ID: C7) indicating the surveillance camera 30 installed in the moving direction is displayed based on the moving direction of the target person P-1 obtained from the extracted video MV. Further, on the map M1, a camera icon C7 indicating a surveillance camera 30 (camera ID: C7) installed in the moving direction of the target person P-1 is highlighted to be surrounded by a circular broken line B.

It is preferable that the user specifies the face portion of the target person P-1 on the screen and performs a drag operation for superimposing the face portion on the camera icon C7 highlighted on the map M1 to request a matching process between the face image of the target person P-1 and an image captured by a camera (camera ID: C7) other than the surveillance camera 30 related to the extracted video MV. Thus, the user can efficiently track the target person P-1.

The method of highlighting the camera icon is not limited to these methods. For example, the display mode of a color, a size, a shape, and the like may be changed in accordance with matching score.

(Second Search Operation)

Figure 15:
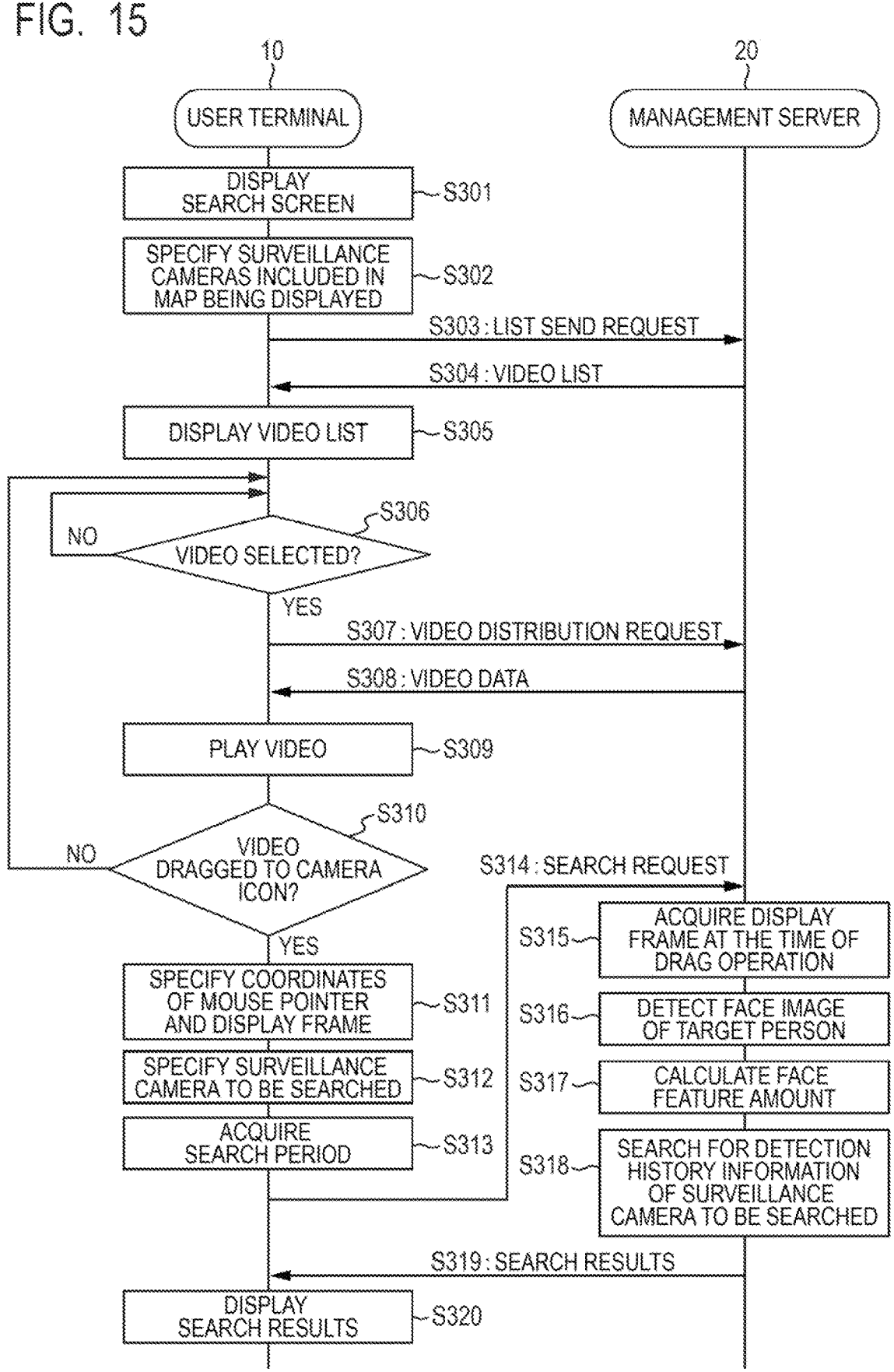
FIG. 15 is a sequence diagram illustrating an example of process in the person search system according to the first example embodiment.

FIG. 15 is a sequence diagram illustrating an example of process in the person search system 1. This process is related to a second search operation performed when the user specifies a target person from a video displayed on a search screen.

Figure 16:
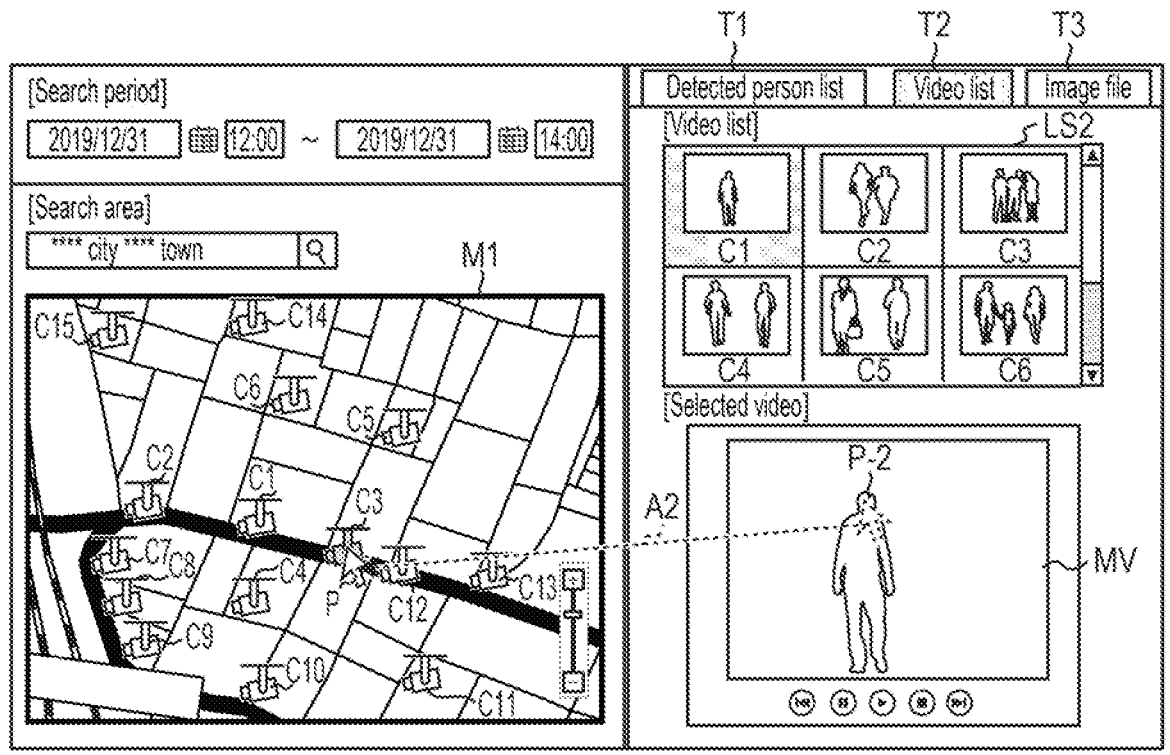
FIG. 16 illustrates an example of a search screen related to a second search operation.

In step S301, the user terminal 10 displays a search screen on the display device 106. FIG. 16 is a diagram illustrating an example of the search screen related to the second search operation. A map M1 of a search area specified by a user operation is displayed in a map display column of the search screen. On the right-side area of the search screen, the tab T2 of the "video list" is selected.

A broken line arrow A2 in FIG. 16 indicates that the user has specified the face portion of the target person P-2 displayed in the selected video MV by the mouse pointer P, and has performed a drag operation to superimpose the face portion of the target person P-2 on the camera icon C3 displayed on the map M1.

In step S302, the user terminal 10 specifies the surveillance camera 30 included in the map being displayed. In the example of FIG. 16, each camera ID (C1 to C15) of a plurality of surveillance cameras 30 corresponding to camera icons C1 to C15 displayed on the map M1 is specified.

In step S303, the user terminal 10 sends a send request of a video list to the management server 20. The send request includes all camera IDs specified in step S302.

In step S304, the management server 20 refers to the detection history information database 24 using the camera ID included in the send request received from the user terminal 10 as a key, and when detection history information related to the specified surveillance camera 30 is acquired, sends a video list that is prepared based on the detection history information to the user terminal 10. When the search period is specified on the search screen, only the detection history information whose detection time is included in the search period can be extracted.

In step S305, the user terminal 10 displays the video list received from the management server 20 on the display device 106. In the example of FIG. 16, a video list LS2 of a plurality of surveillance cameras 30 corresponding to camera icons C1 to C15 displayed on the map M1 is displayed.

In step S306, the user terminal 10 determines whether or not any video has been selected from the video list. If the user terminal 10 determines that the video has been selected (step S306: YES), the process proceeds to step S307.

On the other hand, if the user terminal 10 determines that the video has not been selected (step S306: NO), the process of step S306 is repeated.

In step S307, the user terminal 10 sends a video data distribution request to the management server 20. The distribution request includes a video ID of the video selected from the video list.

In step S308, the management server 20 acquires video data from the storage 204 based on the distribution request received from the user terminal 10, and distributes the video data to the user terminal 10.

In step S309, the user terminal 10 plays the video received from the management server 20. In the example of FIG. 16, since the thumbnail image of the video captured by the surveillance camera 30 having the camera ID "C1" is selected, the video MV is enlarged and displayed in the display column of the selected image located below the video list LS2.

In step S310, the user terminal 10 determines whether or not the video being played has been dragged to the camera icon on the map. If the user terminal 10 determines that the video being played has been dragged to the camera icon on the map (step S310: YES), the process proceeds to step S311.

On the other hand, if the user terminal 10 determines that the video being played has not been dragged to the camera icon on the map (step S310: NO), the process returns to step S306.

In step S311, the user terminal 10 acquires information regarding the display frame of the video at the time of the drag operation and information regarding coordinates of the mouse pointer within the display frame at the time of the drag operation. The coordinates of the mouse pointer indicate the position of the face of the user in the video.

In step S312, the user terminal 10 specifies the surveillance camera 30 as the search target (destination in the drag operation). In the example of FIG. 16, the surveillance camera 30 having the camera ID of "C3" is specified.

Next, the user terminal 10 acquires a search period (step S313). In the example of FIG. 16, "2019/12/31 12: 00" to "2019/12/31 14: 00" are acquired as the search period.

In step S314, the user terminal 10 sends a search request of the target person to the management server 20. The search request includes information such as the camera ID of the surveillance camera 30, the video ID, the display frame, and the coordinates of the target person.

When a face detection frame where the face of each person is detected is superimposed and displayed on the video distributed from the management server 20 in a state in which the face detection frame can be specified, the search request may include the ID of the face detection frame of the target person specified by the user. In this case, information on the coordinates of the target person can be omitted.

In step S315, the management server 20 acquires a display frame at the time of the drag operation from the video data corresponding to the video ID based on the information included in the search request. Next, the management server 20 detects a face image displayed in the coordinate of the target person from the display frame (step S316).

It is preferable that the management server 20 returns the error information to the user terminal 10 when the face of the person does not exist at the coordinate in the video specified on the user terminal 10. However, when there is only one person in the video, the face image of the person can be detected without considering the coordinates.

In step S317, the management server 20 calculates the face feature amount of the detected face image. When the detection process in the person already has been performed in the selected video, the face feature amount of the target person can be acquired from the detection history information database 24.

In step S318, the management server 20 searches the detection history information related to the surveillance camera 30 as the search target (destination in the drag operation) from the detection history information database 24 based on the calculated face feature amount. Specifically, the management server 20 sequentially matches the face feature amount calculated from the face image and the face feature amount of a detected person included in the detection history information, and extracts a person whose similarity (matching score) is equal to or greater than a predetermined threshold.

According to the present example embodiment, the result of the matching process is assumed to be succeeded when matching score calculated by matching process is equal to or greater than a predetermined threshold. When matching score is less than the predetermined threshold, the result of the matching process is assumed to be failed.

In step S319, the management server 20 sends the search results to the user terminal 10. The search results include, for example, information for reading out the surveillance video in which the target person is shown, information on the date and time of capturing the target person, and the like.

Figure 17:
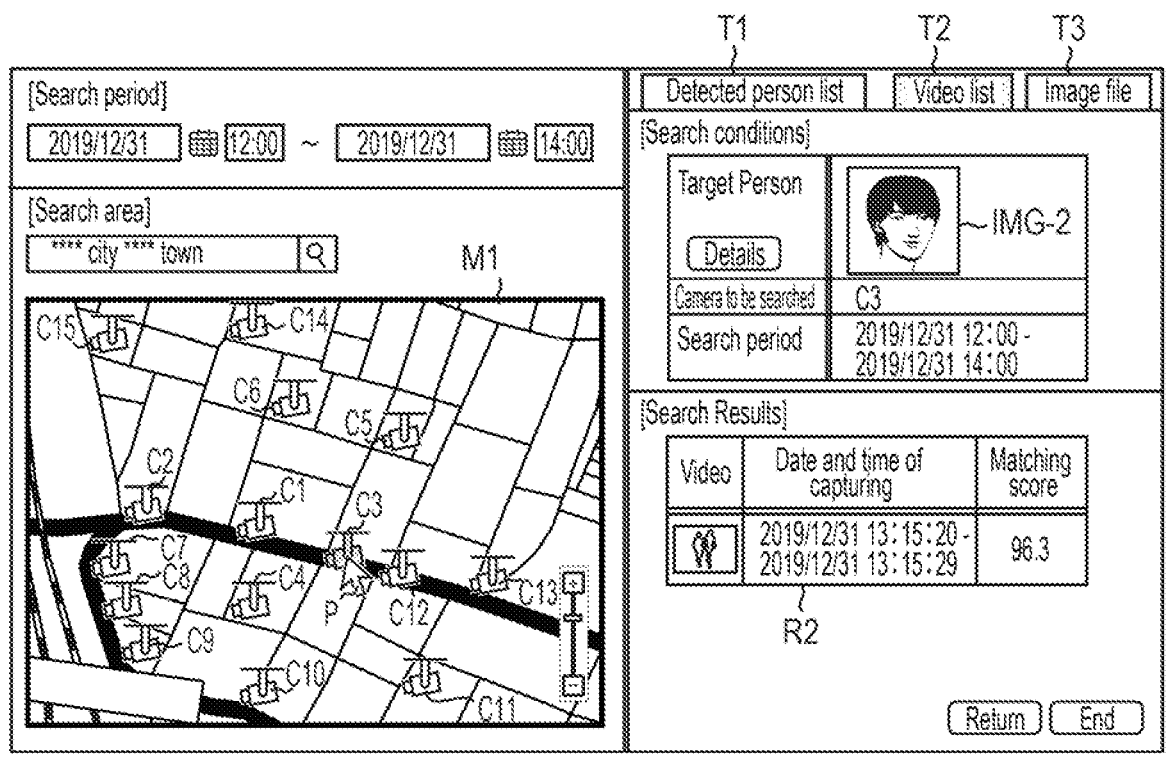
FIG. 17 illustrates an example of search results related to the second search operation.

In step S320, the user terminal 10 displays search results received from the management server 20 on the display device 106. FIG. 17 is a diagram illustrating an example of the search results related to the second search operation. In FIG. 17, the tab T2 of the search screen displays search conditions (face image (IMG-2) of the target person, camera to be searched (C3), and search period) specified by the user and search results R2 (video/date and time of capturing (2019/12/31 13:15:20-2019/12/31 13:15:29)/matching score (96.3)).

(Third Search Operation)

Figure 18:
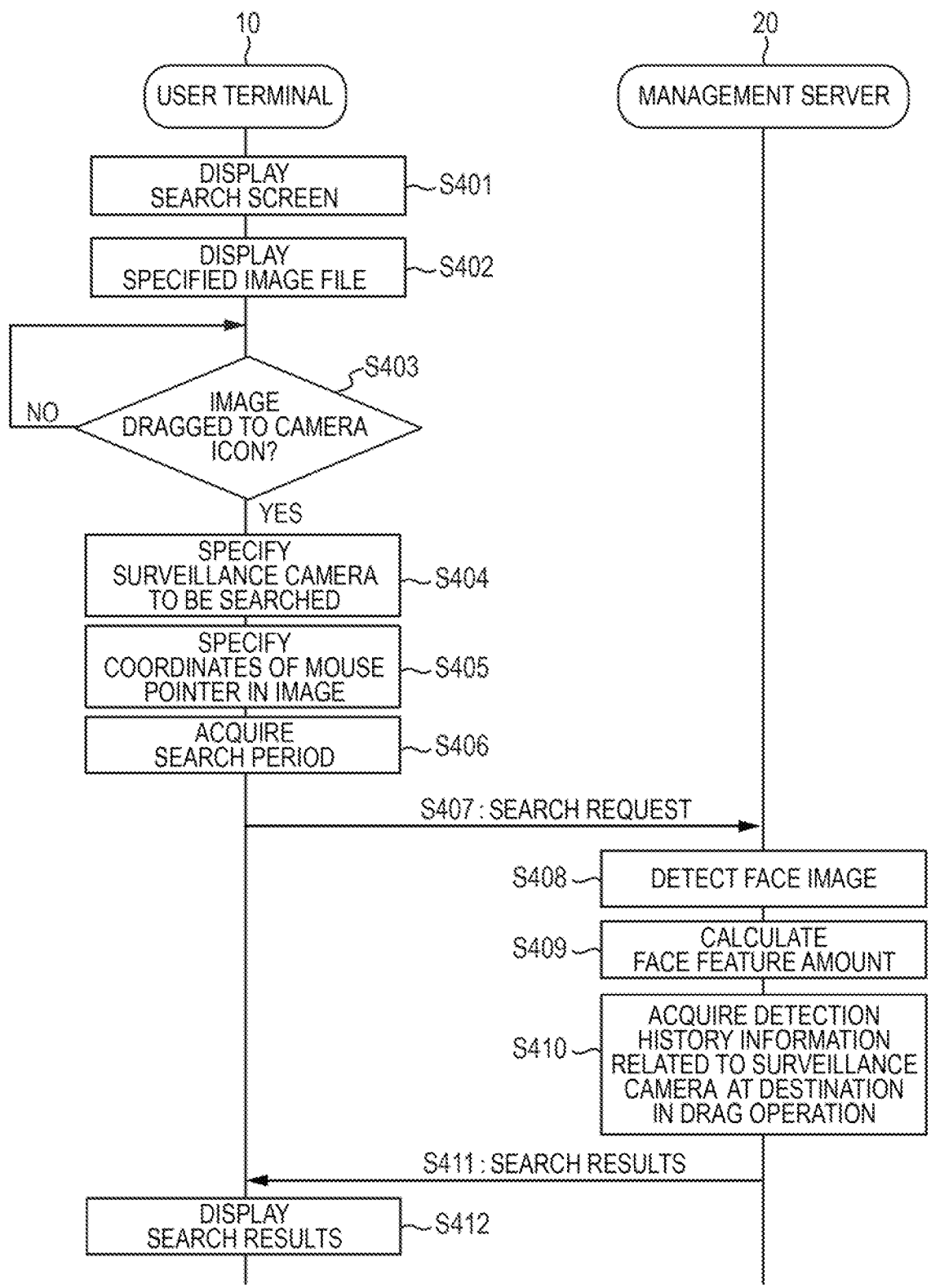
FIG. 18 is a sequence diagram illustrating an example of process in the person search system according to the first example embodiment.

FIG. 18 is a sequence diagram illustrating an example of process of the person search system 1. This process is related to a third search operation performed when the user specifies the target person from an image file freely specified by the user.

Figure 19:
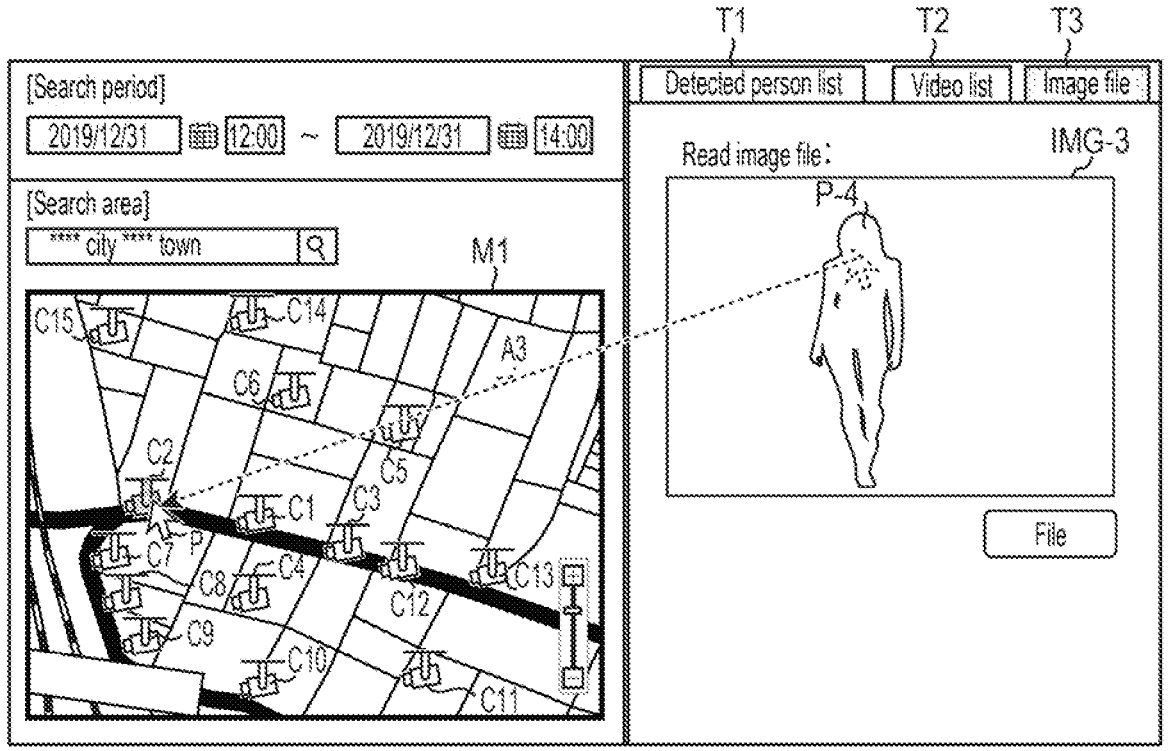
FIG. 19 illustrates an example of a search screen related to a third search operation.

In step S401, the user terminal 10 displays a search screen on the display device 106. FIG. 19 is a diagram illustrating an example of a search screen related to the third search operation. Here, the tab T3 of the "image file" is selected in the right-side area of the search screen. An image IMG-3 of the file read by the user operation is displayed in the tab T3. The readable image file is preferably a still image file or a moving image file.

A broken line arrow A3 in FIG. 19 indicates that the user performs a drag operation for specifying the face portion of the target person P-4 included in the image IMG-3 read in the search screen by the mouse pointer P and superimposing the face portion of the target person P-4 on the camera icon C2 displayed on the map M1.

In step S402, the user terminal 10 reads the image file specified by the user operation and displays the image on the search screen.

In step S403, the user terminal 10 determines whether or not the image of the person being displayed has been dragged to the camera icon on the map. If the user terminal 10 determines that the image has been dragged to the camera icon on the map (step S403: YES), the process proceeds to step S404.

On the other hand, if the user terminal 10 determines that the image has not been dragged to the camera icon on the map (step S403: NO), the process of step S403 is repeated.

In step S404, the user terminal 10 specifies the destination in the drag operation of the image file, that is, the surveillance camera 30 corresponding to the camera icon to be searched, and acquires the camera ID. In the example of FIG. 19, the camera ID of the surveillance camera 30 corresponding to the camera icon as the destination in the drag operation is "C2".

In step S405, the user terminal 10 acquires the coordinates of the mouse pointer in the image at the time of the drag operation. Next, the user terminal 10 acquires the search period specified by the user on the search screen (step S406).

In step S407, the user terminal 10 sends a search request of the target person to the management server 20. The search request includes information such as the read image file, the coordinates of the face specified in the image, the search period, and the camera ID of the surveillance camera 30 as the destination in the drag operation.

In step S408, the management server 20 detects the face image of the target person from the image of the image file based on the coordinates of the face included in the search request. In the example of FIG. 19, the management server 20 detects a face image of the target person P-4 from the image IMG-3.

It is preferable that the management server 20 returns the error information to the user terminal 10 when the face of the person does not exist at the coordinate in the image specified on the user terminal 10 side. However, when there is only one person in the image, the face image of the person can be detected without considering the coordinates.

Next, the management server 20 calculates the face feature amount from the detected face image of the target person (step S409).

In step S410, the management server 20 searches the detection history information related to the surveillance camera 30 as the destination in the drag operation based on the calculated face feature amount. Specifically, the management server 20 sequentially matches the face feature amount calculated from the face image and the face feature amount of a detected person included in the detection history information, and extracts a person whose similarity is equal to or greater than a predetermined threshold.

In step S411, the management server 20 sends search results to the user terminal 10. The search results include, for example, information for reading out the surveillance video in which the target person is shown, information on the date and time of capturing the target person, and the like.

Figure 20:
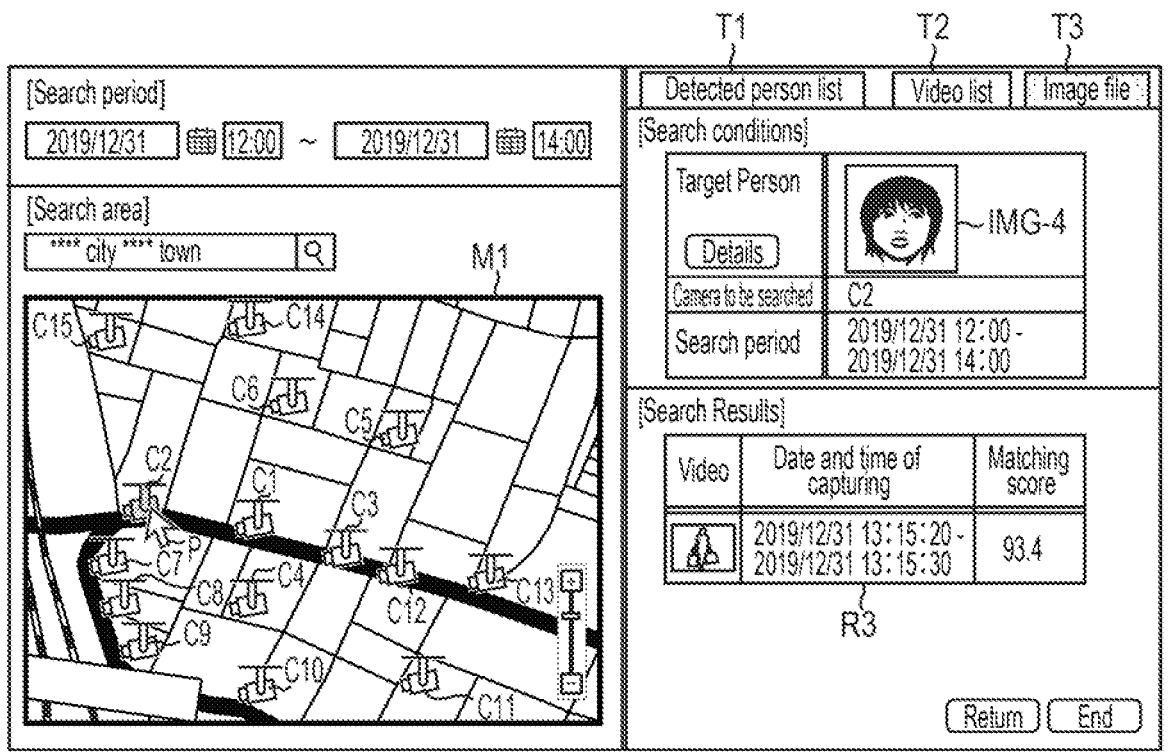
FIG. 20 illustrates an example of search results related to the third search operation.

In step S412, the user terminal 10 displays the search results on the display device 106. FIG. 20 is a diagram illustrating an example of search results related to the third search operation. In FIG. 20, the tab T3 of the search screen displays search conditions (face image of the target person (IMG-4), camera to be searched (C2), and search period) specified by the user and search results R3 (video/date and time of capturing (2019/12/31 13:15:20-2019/12/31 13:15:30)/matching score (93.4)).

(Fourth Search Operation)

Figure 21:
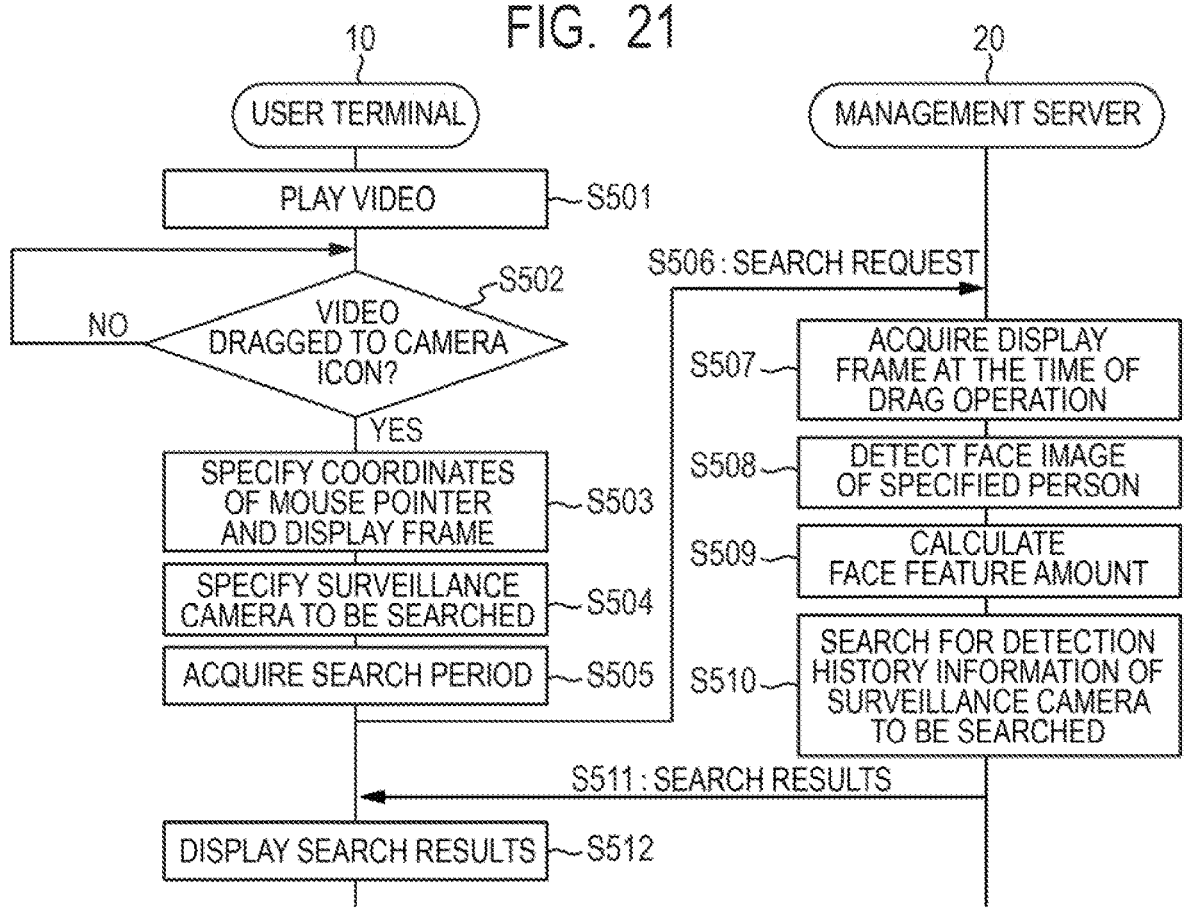
FIG. 21 is a sequence diagram illustrating an example of process in the person search system according to the first example embodiment.

FIG. 21 is a sequence diagram illustrating an example of process of the person search system 1. This process is related to a fourth search operation performed when the user specifies the target person from videos of search results. The fourth search operation is a search operation in which the user specifies any persons from videos of search results obtained by performing anyone of the first to third search operations.

In step S501, the user terminal 10 plays a video of the search results received from the management server 20 on the display device 106.

Figure 22:
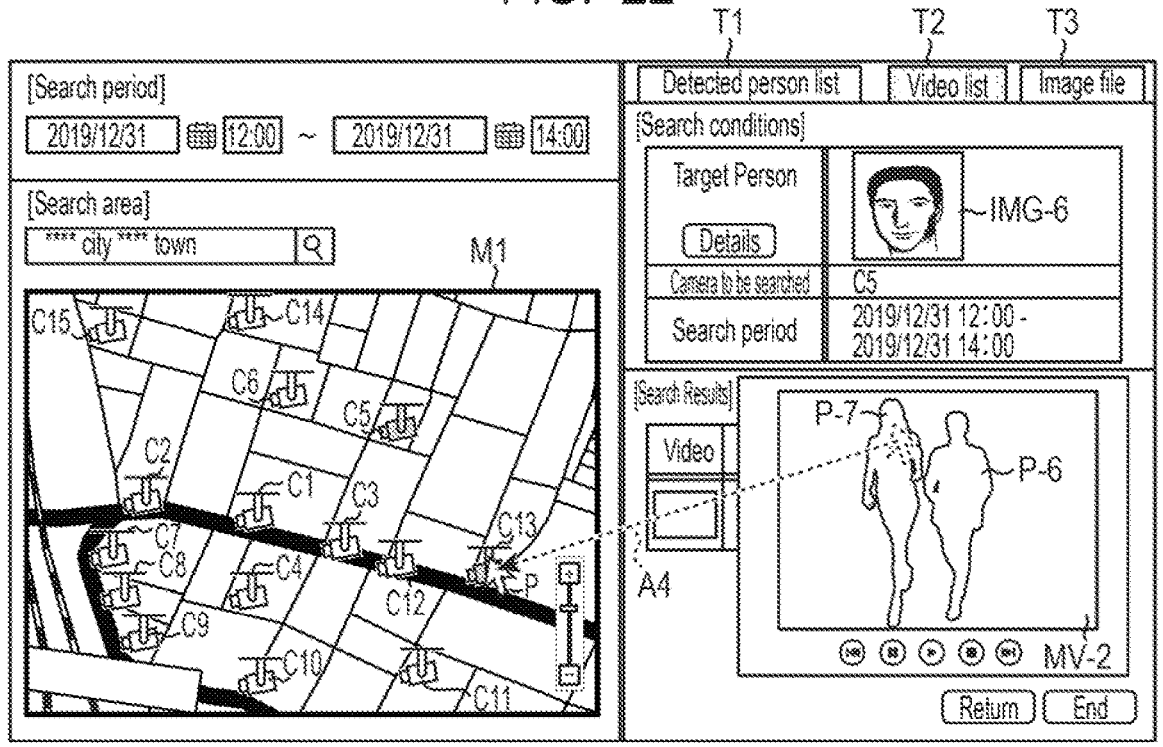
FIG. 22 illustrates an example of a search screen related to a fourth search operation.

FIG. 22 is a diagram illustrating an example of a search screen related to the fourth search operation. Here, the video MV-2, which is the previous search results, is superimposed and displayed on the search screen. The target person of the face image IMG-6 included in the search conditions is a person of the symbol P-6 in the video MV-2.

A broken line arrow A4 in FIG. 22 indicates that the user performs a drag operation for specifying person P-7 different from the target person P-6 in the video MV-2 as a new target person by the mouse pointer P and superimposing the video MV-2 on the camera icon C13 related to another surveillance camera 30.

In step S502, the user terminal 10 determines whether or not the video being played has been dragged to the camera icon on the map. If the user terminal 10 determines that the video being played has been dragged to the camera icon on the map (step S502: YES), the process proceeds to step S503.

On the other hand, if the user terminal 10 determines that the video being played has not been dragged to the camera icon on the map (step S502: NO), the process of step S502 is repeated.

In step S503, the user terminal 10 acquires the information of the display frame in the video at the time of the drag operation and the coordinates of the specified person in the display frame.

In step S504, the user terminal 10 specifies the surveillance camera 30 as the search target (destination in the drag operation). In the example of FIG. 22, the camera ID of the surveillance camera 30 corresponding to the camera icon as the destination in the drag operation is "C13".

Next, the user terminal 10 acquires the search period (step S505). In the example of FIG. 22, "2019/12/31 12: 00" to "2019/12/31 14: 00" is specified as the search period.

In step S506, the user terminal 10 sends a search request for the specified person to the management server 20. The search request includes information such as the video ID of the video as the origin in the drag operation, the display frame, the coordinates of the face of the specified person, and the camera ID of the surveillance camera 30 as the destination (search target) in the drag operation.

In step S507, the management server 20 acquires the display frame at the time of the drag operation based on the information included in the search request.

In step S508, the management server 20 detects the face image of the specified person existing at the specified coordinates in the display frame. In the example of FIG. 22, the management server 20 detects the face image of the target person P-7 from the display frame at the time of the drag operation.

It is preferable that the management server 20 returns the error information to the user terminal 10 when the face of the person does not exist at the coordinates specified by the user terminal 10. However, if only one person exists in the video, the face image of the person may be automatically detected without considering the specified coordinates.

In step S509, the management server 20 calculates the face feature amount of the detected face image. If the detection process of the person has already been performed in the selected video, the face feature amount of the specified person can be acquired from the detection history information database 24.

In step S510, the management server 20 searches the detection history information database 24 for detection history information related to the surveillance camera 30 at the destination in the drag operation based on the calculated face feature amount. Specifically, the management server 20 sequentially matches the face feature amount calculated from the face image of the specified person and the face feature amount of the detected person included in the detection history information, and extracts a person whose similarity is equal to or greater than a predetermined threshold.

In step S511, the management server 20 sends search results to the user terminal 10. The search results include, for example, information for reading out the surveillance video in which the specified person is shown, information on the date and time of capturing the target person, and the like.

Figure 23:
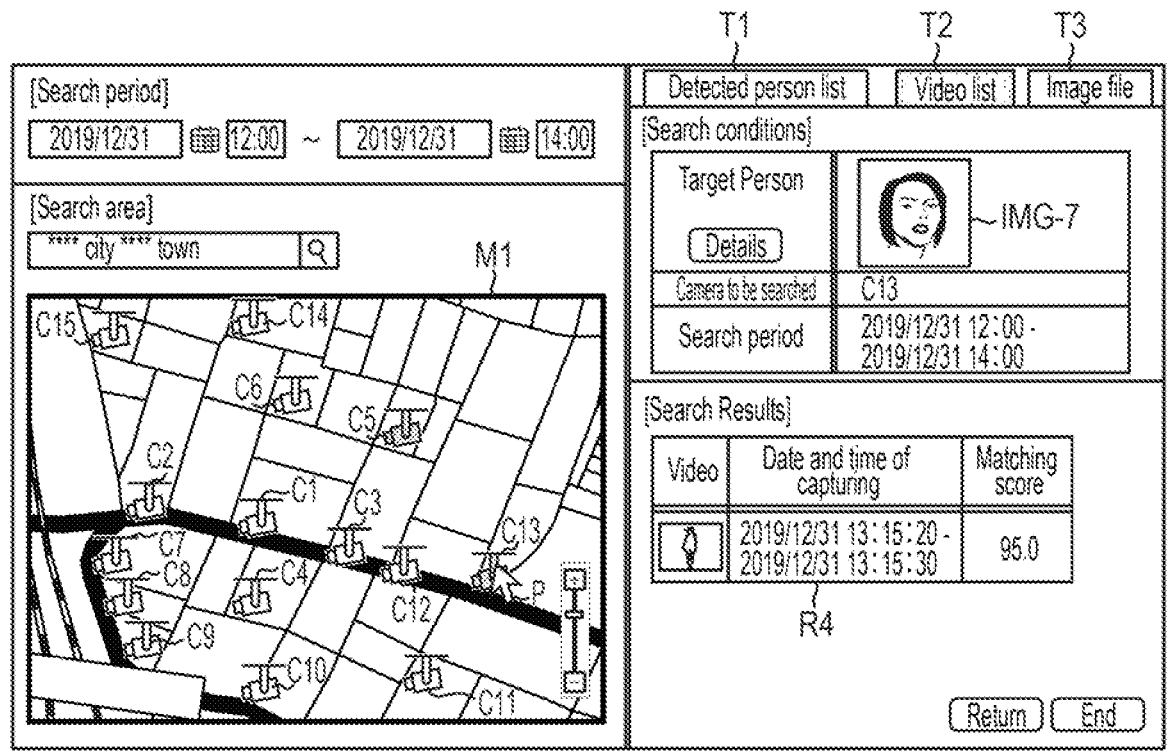
FIG. 23 illustrates an example of search results related to the fourth search operation.

In step S512, the user terminal 10 displays search results received from the management server 20 on the display device 106. FIG. 23 is a diagram illustrating an example of search results related to the fourth search operation. In FIG. 23, the tab T2 of the search screen displays search conditions (face image of the target person (IMG-7), camera to be searched (C13), and search period) specified by the user and search results R4 (video/date and time of capturing (2019/12/31 13:15:20-2019/12/31 13:15:30)/matching score (95.0)).

According to the present example embodiment, the user performs a drag operation in which the face portion of the target person displayed on the screen (or the entire image in which the target person is shown) is superimposed on the camera icon on the map, so that the target person can be searched from the surveillance video captured by the surveillance camera 30 corresponding to the camera icon as the destination in the drag operation. That is, the user can easily search for the target person from the surveillance video captured by the desired surveillance camera 30.

Second Example Embodiment

The present example embodiment differs from first example embodiment in that the face image of the only target person specified by the user on the screen is collectively matched with videos captured by the plurality of surveillance cameras 30 specified on the map.

Figure 24:
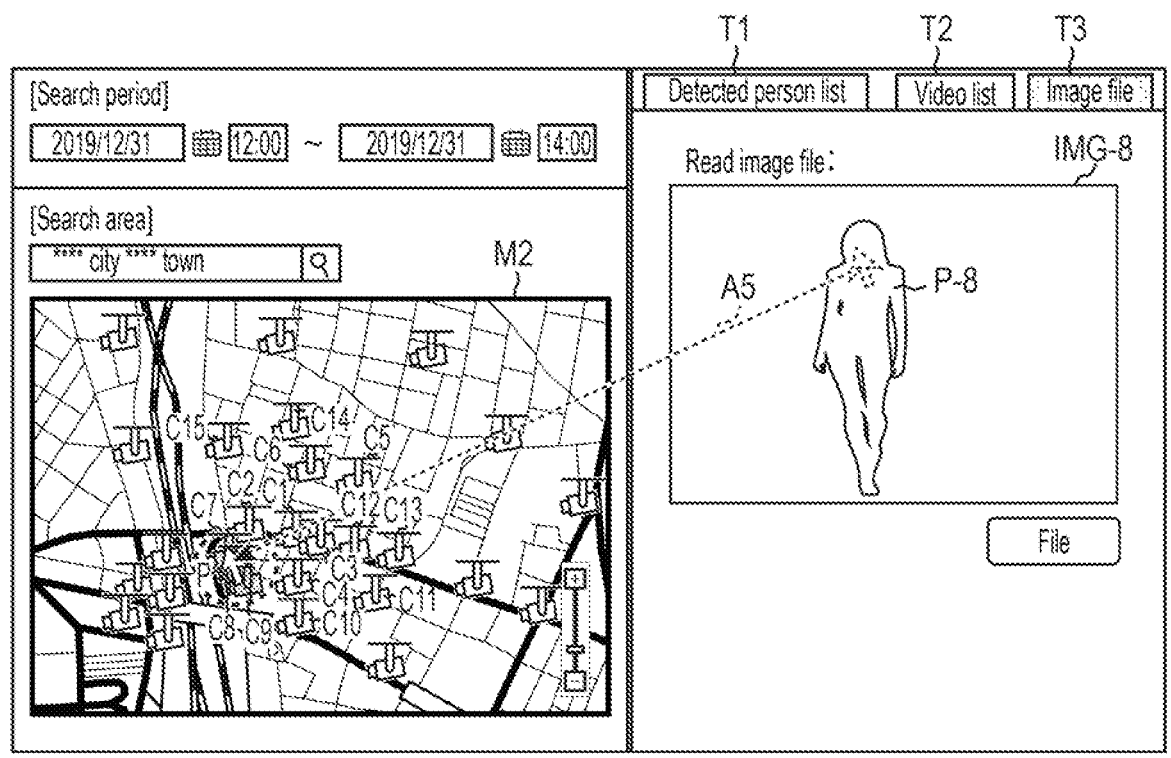
FIG. 24 is a diagram illustrating an example of a search screen according to a second example embodiment.

FIG. 24 is a diagram illustrating an example of a search screen according to the present example embodiment. The search area illustrated in the map M2 is wider than the search area of the map M1 illustrated in FIG. 10. The scale of the map M2 is different from that of the map M1. For this reason, adjacent camera icons are superimposed and displayed on a part of the map M2.

A broken line arrow A5 in FIG. 24 indicates that the user performs a drag operation for specifying the face portion of the target person P-8 in an image IMG-8 read in the search screen with the mouse pointer P and superimposing the image IMG-8 on a plurality of camera icons superimposed and displayed on the map M2.

The method of specifying a plurality of camera icons at a time is not limited to this. For example, the mouse pointer P may be operated so that the mouse pointer P pass over and overlap a plurality of camera icons during the mouse pointer P is in a dragging state. That is, even when a plurality of camera icons is not superimposed and displayed, the plurality of camera icons can be specified.

Figures 25, 26:
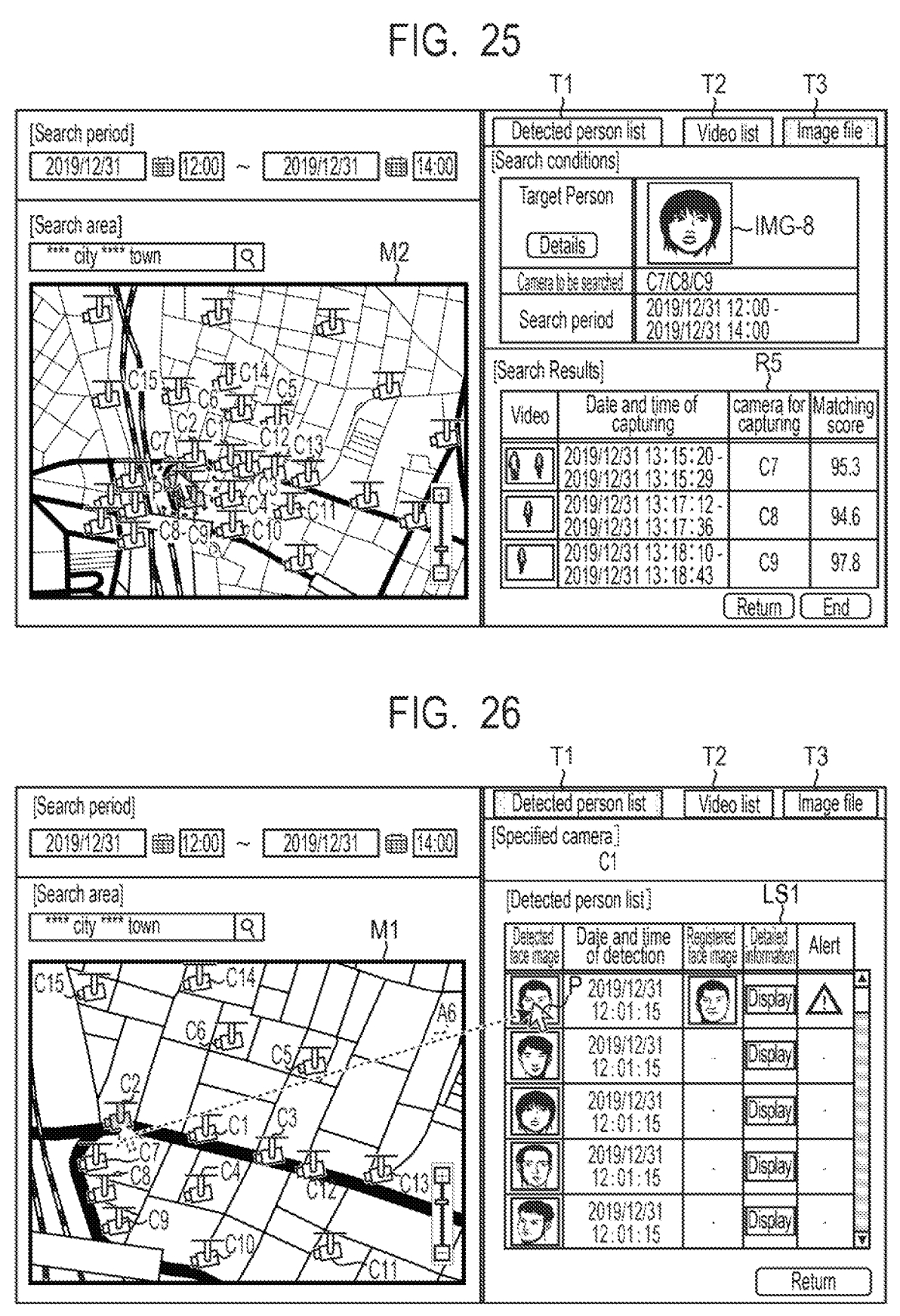

FIG. 25 is a diagram illustrating an example of search results according to the present example embodiment. In FIG. 25, the tab T3 of the search screen displays search conditions (face image of the target person (IMG-8), camera to be searched (C7/C8/C9), search period) specified by the user and search results R5 (video/capturing date/capturing camera (C7/C8/C9)/matching score (95.3/94.6/97.8)). By referring to the search results R5, the user can determine that the target person is captured by all the surveillance cameras 30 having camera IDs "C7", "C8", and "C9". Further, in the search results R5, since the videos are displayed in time series, the user can easily understand the flow line of the target person.

According to the present example embodiment, the user need not specify camera icon corresponding to the surveillance cameras 30 to be searched one by one. Since the user can collectively request matching processes of the face image of the target person and the videos captured by the plurality of surveillance cameras 30, the user can perform search operation more efficiently.

Third Example Embodiment

The present example embodiment differs from example embodiment described above in that the user can request a search process for a target person by dragging operation for superimposing a camera icon specified by the user on the map on a face image of the target person being displayed on the screen.

FIG. 26 is a diagram illustrating an example of a search screen according to the present example embodiment. A broken line arrow A6 in FIG. 26 indicates that the user drags one camera icon specified on the map to one face image displayed in the detected person list LS1. That is, the direction of the drag operation by the user in FIG. 26 is opposite to that in FIG. 11.

In the present example embodiment, the search process common to the first example embodiment is performed even when the user performs a drag operation in the reverse direction of the first example embodiment. As a result, according to the present example embodiment, an effect similar to that of the first example embodiment can be achieved.

Fourth Example Embodiment

The present example embodiment differs from example embodiment described above in that the user can perform a drag operation in which a plurality of camera icons specified on the map are superimposed on a face image of the target person being displayed on the same screen.

Figure 27:
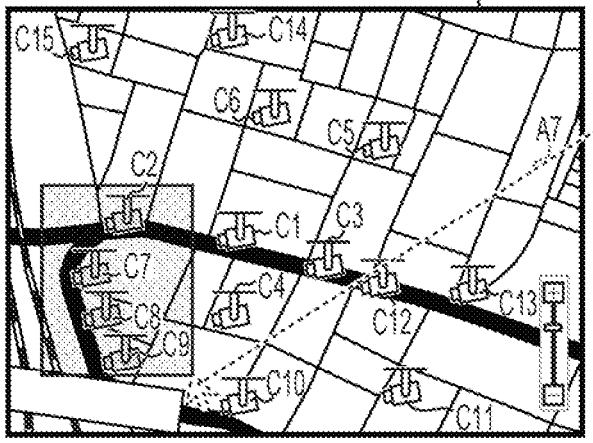
FIG. 27 is a diagram illustrating an example of a search screen according to a fourth example embodiment.

FIG. 27 is a diagram illustrating an example of a search screen according to the present example embodiment. A broken line arrow A7 in FIG. 27 indicates that a plurality of camera icons specified by the user on the map M1 are dragged together to one face image displayed in the detected person list LS1. That is, the direction of the drag operation by the user in FIG. 27 is opposite to that in FIGS. 19, 24, and the like.

According to the present example embodiment, even when the user performs the drag operation in the reverse direction to that of the first or second example embodiment, the search process common to the example embodiment described above is performed. As a result, according to the present example embodiment, an effect similar to that of each example embodiment can be achieved.

Fifth Example Embodiment

The present example embodiment differs from example embodiment described above in that a fifth search operation can be performed. In the fifth search operation, one camera icon selected on the map is superimposed on another camera icon.

Furthermore, according to the present example embodiment, a sixth search operation can also be performed. In the sixth search operation, a part or all of the search results obtained by performing the fifth search operation is superimposed on the camera icon on the map.

(Fifth Search Operation)

Figure 28:
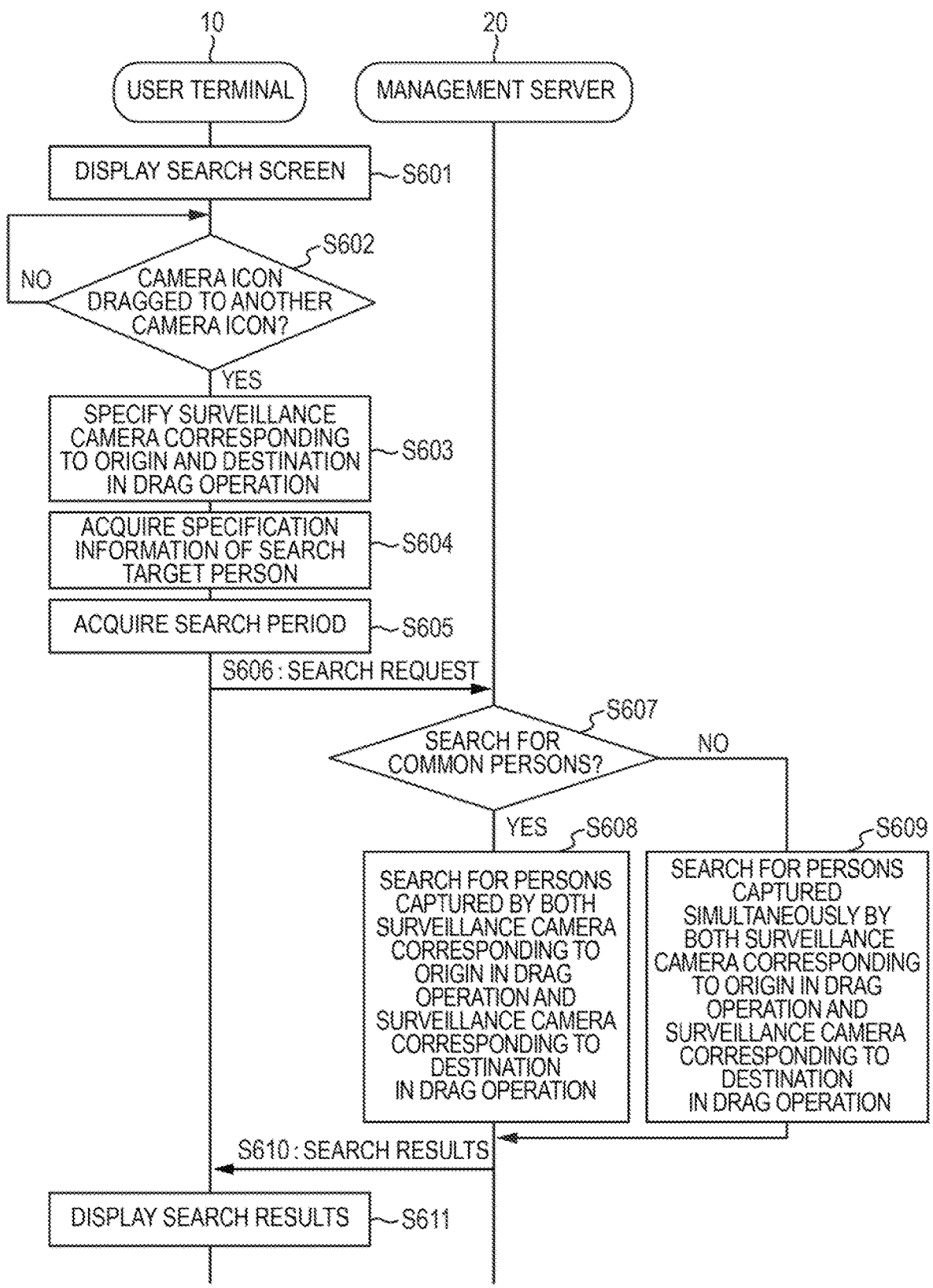
FIG. 28 is a sequence diagram illustrating an example of process in a person search system according to a fifth example embodiment.

FIG. 28 is a sequence diagram illustrating an example of process of the person search system 1 according to the present example embodiment. This process is related to the fifth search operation.

In step S601, the user terminal 10 displays a search screen on the display device 106. FIG. 29 is a diagram illustrating an example of the search screen related to the fifth search operation. Here, the check box CB is included in the display column of the search option. According to the present example embodiment, the user switches the search operation by ON/OFF operation of the check box CB.

More specifically, when the check box CB is OFF, a common persons captured in common by the two surveillance cameras 30 is the search target. On the other hand, when the check box is ON, among the common persons, a group of a plurality of persons who are simultaneously captured (together) is the search target.

In step S602, the user terminal 10 determines whether or not the camera icon selected on the map has been dragged to another camera icon. If the user terminal 10 determines that the selected camera icon has been dragged to another camera icon (step S602: YES), the process proceeds to step S603.

On the other hand, if the user terminal 10 determines that the selected camera icon has not been dragged to another camera icon (step S602: NO), the process of step S602 is repeated.

In step S603, the user terminal 10 specifies the surveillance cameras 30 corresponding to the camera icons of the origin and destination in the drag operation, respectively. In the example of FIG. 29, the camera ID of the surveillance camera 30 corresponding to the camera icon C1 as the origin in the drag operation is "C1". The camera ID of the surveillance camera 30 corresponding to the camera icon C2 as the destination in the drag operation is "C2".

In step S604, the user terminal 10 acquires the specification information of the person to be searched specified on the search screen. Next, the user terminal 10 acquires the search period specified on the search screen by the user operation (step S605).

In step S606, the user terminal 10 sends a search request of the common persons to the management server 20. The search request includes information such as the camera IDs of the two surveillance cameras 30 of the origin and destination in the drag operation, the search period, and specification information of the search target.

In step S607, the management server 20 determines whether or not the search target is a "common persons". If the management server 20 determines that the search target is the "common persons" (step S607: YES), the process proceeds to step S608.

On the other hand, if the management server 20 determines that the search target is not the "common persons" but "group of common persons" (step S607: NO), the process proceeds to step S609.

In step S608, the management server 20 searches for a person (common persons) captured in common by the surveillance cameras 30 corresponding to each of the origin and destination in the drag operation based on the search conditions included in the search request.

On the other hand, in step S609, the management server 20 searches for a group of persons (common persons) who are captured at the same time by the surveillance cameras 30 corresponding to each of the origin and destination in the drag operation, based on the search conditions included in the search request.

In step S610, the management server 20 sends the search results to the user terminal 10. The search results include, for example, information for reading out the surveillance video in which the common persons are shown, information on the date and time of capturing the common persons, and the like.

Figure 31:
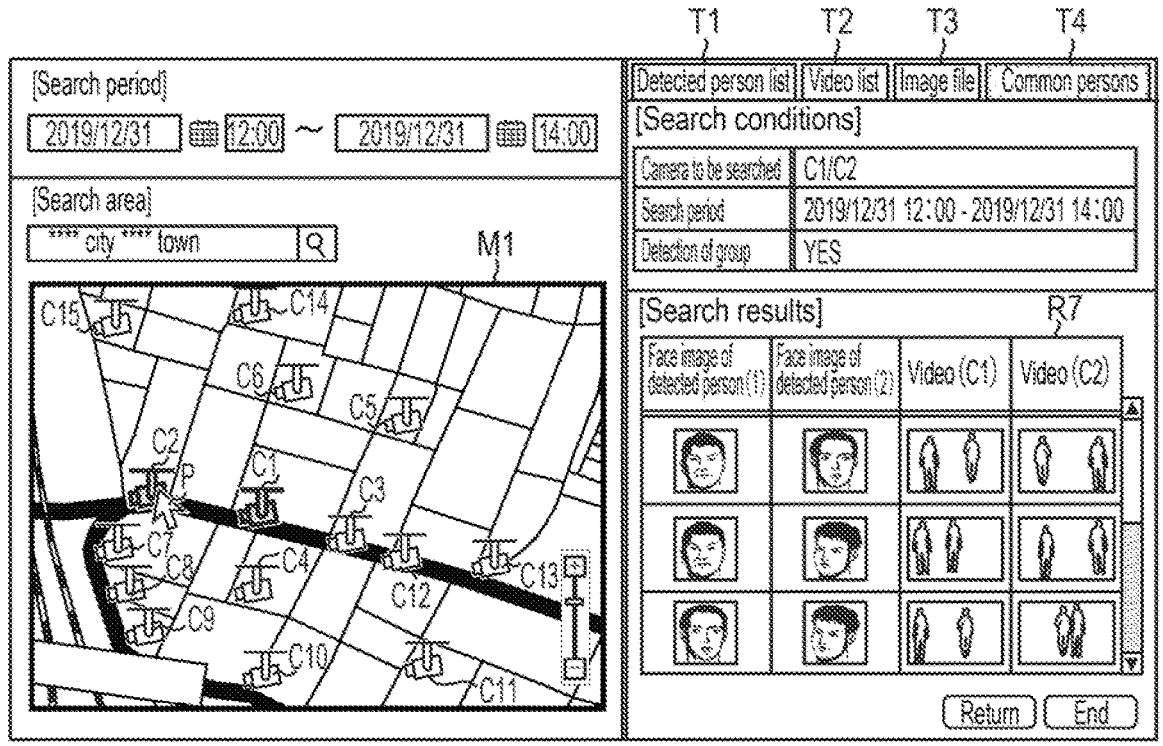
FIG. 31 illustrates an example of search results related to the fifth search operation.

In step S611, the user terminal 10 displays the search results on the display device 106. FIGS. 30 and 31 are diagrams illustrating an example of search results related to the fifth search operation.

In FIG. 30, it is included in the search conditions that a "group detection" regarding common persons is not to be performed. That is, the above example of FIG. 29 corresponds to the case where the check box CB is set to OFF. Therefore, as the search results R6, list information of the persons captured by both of the two surveillance cameras 30 (camera ID: C1/C2) to be searched is displayed.

On the other hand, in FIG. 31, it is included in the search conditions that a "group detection" of common persons is to be performed. Therefore, as the search results R7, list information of the group of persons captured together by both of the two surveillance cameras 30 (camera ID: C1/C2) to be searched is displayed. The video included in the search results R7 may be extracted only from scenes in the video in which the group was simultaneously captured.

(Sixth Search Operation)

Figure 32:
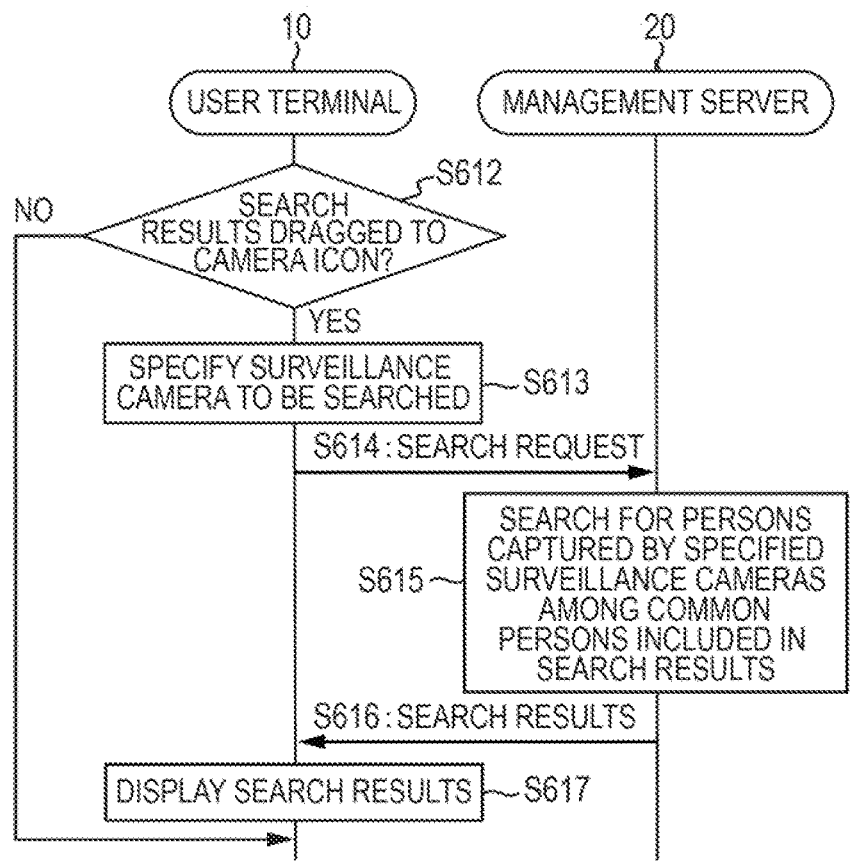
FIG. 32 is a sequence diagram illustrating an example of process of a person search system according to the fifth example embodiment.

FIG. 32 is a sequence diagram illustrating an example of process of the person search system 1 according to the present example embodiment. This process is related to the sixth search operation described above, and may be performed after the process of FIG. 28.

In step S612, the user terminal 10 determines whether or not the search results have been dragged to the camera icon displayed on the map. If the user terminal 10 determines that the search results have been dragged to the camera icon (step S612: YES), the process proceeds to step S613.

On the other hand, when the user terminal 10 determines that the search results have not been dragged to the camera icon (step S612: NO), the process of FIG. 32 ends.

Figures 33, 34:
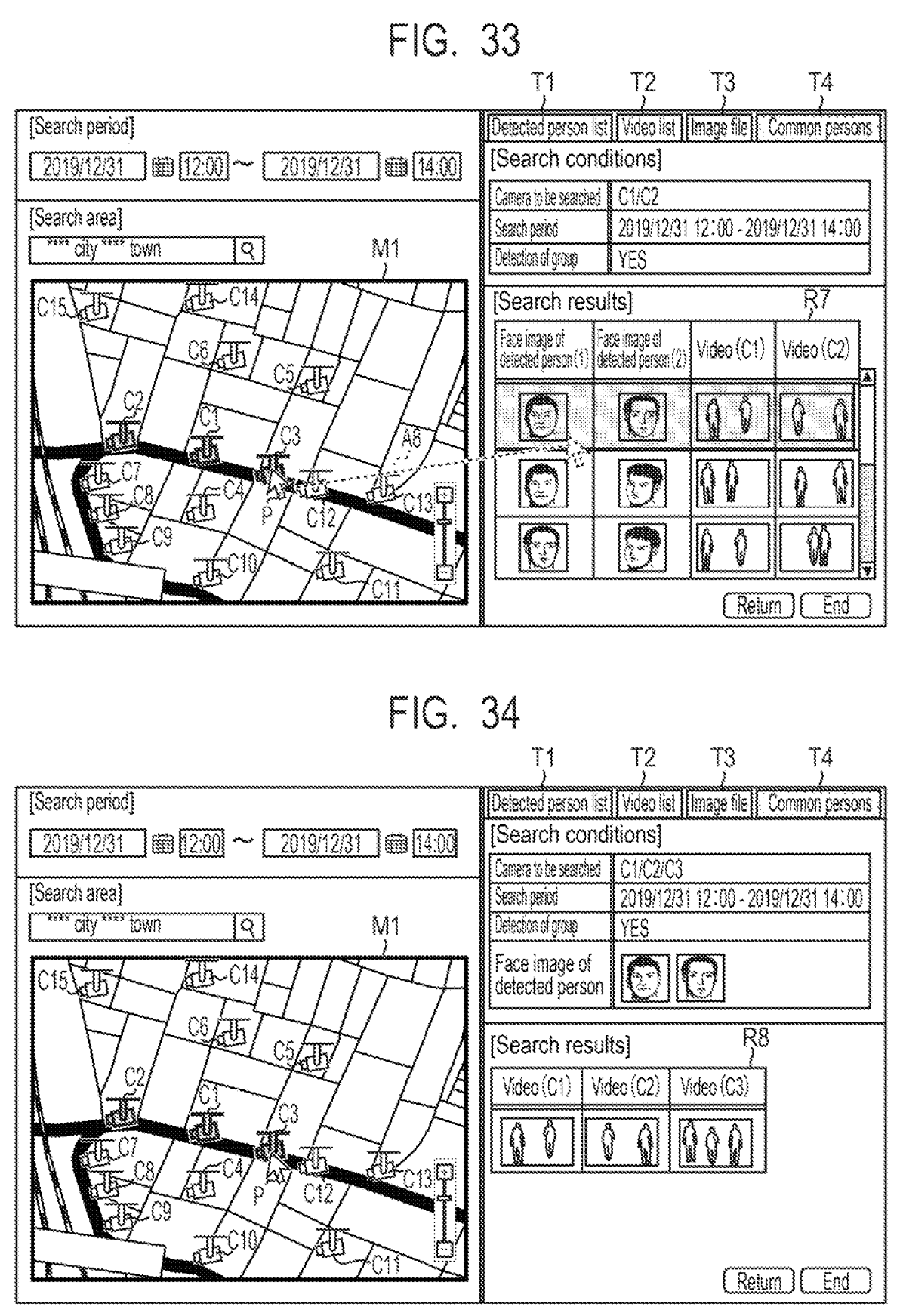

In step S613, the user terminal 10 specifies the camera ID of a new surveillance camera 30 to be searched based on the user operation. FIG. 33 is a diagram illustrating an example of a search screen related to the sixth search operation. A broken line arrow A8 in FIG. 33 indicates that the user performs a drag operation for specifying, with the mouse pointer P, a part of the search results of the search process performed earlier and superimposing, on the camera icon on the map, the search results.

In the example of FIG. 33, a group of persons at the top of the list information of the search results R7 is specified. The management server 20 searches the video of the surveillance camera 30 corresponding to the camera icon C3 as the destination in the drag operation based on the group of the face images of the specified person.

In step S614, the user terminal 10 sends a search request of the common persons to the management server 20. The search request includes information such as identification information for identifying the search results of the search process performed in advance, a search period, a camera ID of the surveillance camera 30 to be searched, and specification information of a person to be searched.

In step S615, the management server 20 searches the detection history information database 24 for a person who is also captured by the specified surveillance camera 30 among the common persons included in the search results based on the search conditions included in the search requests. Here, it is assumed that the person to be searched differs according to the specification information on the search screen.

For example, when the search target is a "common persons", among the common persons captured by both the first camera and the second camera, a person also captured by the third camera is searched.

On the other hand, when the search target is a "group of common persons", among the group of common persons simultaneously captured by the first camera and the second camera, a group of persons simultaneously further captured by the third camera is searched.

FIG. 34 is a diagram illustrating an example of search results related to the sixth search operation. The search results R8 illustrates that the group of the persons specified in FIG. 33 is extracted from the video related to the surveillance camera 30 (camera ID: C3) as the destination (search target) in the drag operation.

According to the present example embodiment, the user can acquire list information of persons captured by the plurality of surveillance cameras 30 in common and the list information of groups of persons captured by the plurality of surveillance cameras 30 in common at the same time by performing, on the map, a drag operation for superimposing camera icons each other. Thus, the user can efficiently perform the operation for reducing the number of the target persons and the operation for reducing the number of relevant persons of the target person.

In addition, according to the present example embodiment, since the drag operation is performed to superimpose, on the camera icon on the map, the search results themselves, it is possible to search the results of the search process previously performed.

Sixth Example Embodiment

The present example embodiment differs from example embodiments described above in that the required time related to the target person is estimated based on the distance between the surveillance camera 30 (Hereinafter referred to as a "first camera".) that captured the target person and another surveillance camera 30 (Hereinafter referred to as a "second camera".) corresponding to the camera icon as the destination in the drag operation and the search period is automatically determined based on the capturing time by the first camera and the required time. The "required time" is the time required for the target person to move from the location of the first camera to the location of the second camera.

Figure 35:
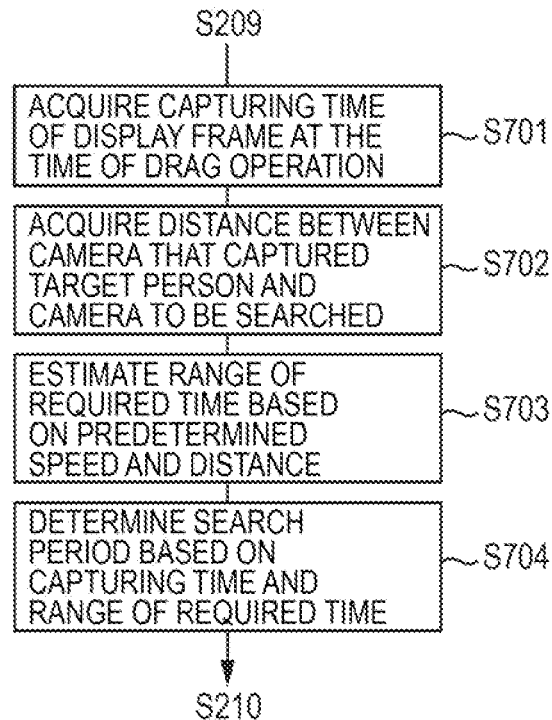
FIG. 35 is a flowchart illustrating an example of process in the person search system according to the sixth example embodiment.

FIG. 35 is a flowchart illustrating an example of process of the person search system 1 according to the present example embodiment. This process may be performed, for example, between step S209 and step S210 illustrated in FIG. 9.

In step S701, the user terminal 10 acquires the capturing time of the display frame displayed on the screen when the face image of the target person is dragged.

In step S702, the user terminal 10 acquires a distance between the surveillance camera 30 that captured the target person and the surveillance camera 30 corresponding to the camera icon as the destination in the drag operation. The distance between the two surveillance cameras 30 can be calculated, for example, from the location information stored in the camera information database 23. If there is a table recording the distance between the cameras, the distance can be obtained by referring to the table based on the two camera IDs.

In step S703, the user terminal 10 estimates the range of the required time based on the predetermined speed and the distance between the cameras. As the "predetermined speed", it is preferable that a range of an average walking speed of a human being is set, for example, from three to five kilometers per hour.

In step S704, the user terminal 10 determines a search period related to the surveillance camera 30 as the destination in the drag operation based on the capturing time and the range of the required time. Thereafter, the process proceeds to step S210 illustrated in FIG. 9.

According to the present example embodiment, the search period related to the surveillance camera 30 as the destination in the drag operation can be automatically searched based on the distance between the surveillance camera 30 that captured a video in which the target person is specified and the surveillance camera 30 that corresponds to the camera icon as the destination in the drag operation of the face image of the target person. Thus, the speed of the search process in the person search system 1 is improved.

Seventh Example Embodiment

The present example embodiment differs from example embodiments described above in that the moving speed of the target person is calculated by analyzing the video used for specifying the target person, and a search period related to the surveillance camera 30 as the search target is automatically determined based on the moving speed and the distance between the two surveillance cameras 30.

Figure 36:
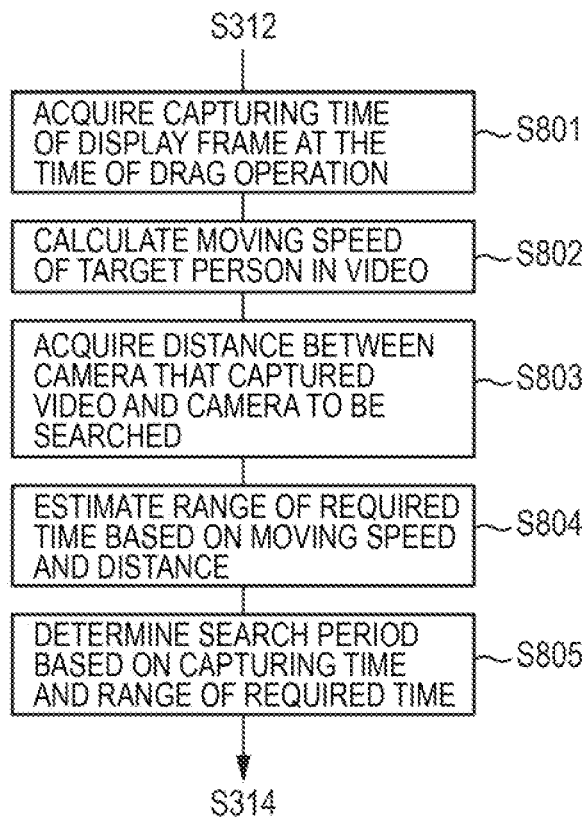
FIG. 36 is a flowchart illustrating an example of process in the person search system according to the seventh example embodiment.

FIG. 36 is a flowchart illustrating an example of process of the person search system 1 according to the present example embodiment. This process may be performed between step S312 and step S314 illustrated in FIG. 15.

In step S801, the user terminal 10 acquires the capturing time of the display frame displayed on the screen when the face image of the target person is dragged.

In step S802, the user terminal 10 calculates the moving speed of the target person in the video. For example, the moving speed of the target person is calculated based on the length of time during which the target person is actually captured by the surveillance camera 30 and the moving distance of the target person obtained from the information (for example, magnification or capturing angle) of the video.

In step S803, the user terminal 10 acquires a distance between the surveillance camera 30 that captured the target person and the surveillance camera 30 corresponding to the camera icon as the destination in the drag operation.

In step S804, the user terminal 10 estimates the range of the required time based on the moving speed and the distance between the cameras. For example, a case where the moving speed of the target person calculated in step S802 is 4.5 km/h and the distance between the cameras is 0.4 km will be described. In this case, for example, by assuming that the moving speed range of the target person is from four to five kilometers per hour, the range of the required time can be calculated as 4.8 minutes (=(0.4/5)×60) to 6 minutes (=(0.4/4)×60).

In step S805, the user terminal 10 determines a search period in the surveillance camera 30 related to the destination in the drag operation based on the capturing time and the range of the required time. Thereafter, the process proceeds to step S314 illustrated in FIG. 15.

According to the present example embodiment, based on the moving speed of the target person and the distance between the two surveillance cameras 30 obtained by image analysis, it is possible to automatically limit the search period related to the surveillance camera 30 as the destination in the drag operation. Thus, the speed of the search process in the person search system 1 is improved.

Eighth Example Embodiment

Figure 37:
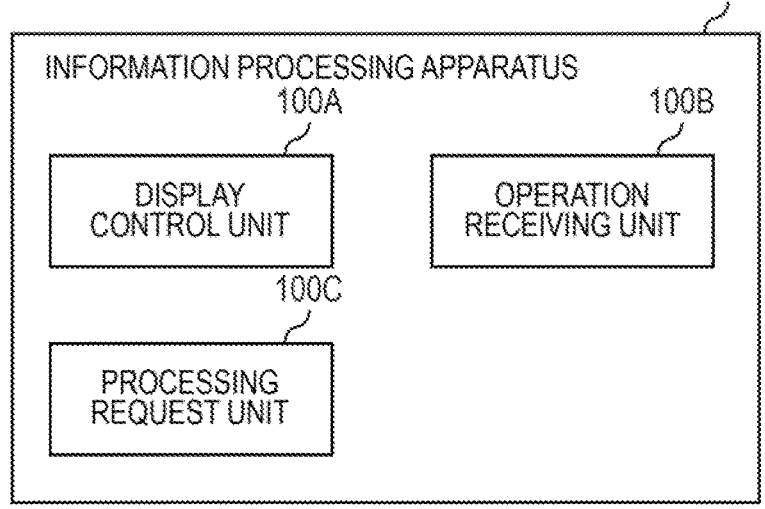
FIG. 37 is a block diagram illustrating a configuration of an information processing apparatus according to an eighth example embodiment.

FIG. 37 is a block diagram illustrating a configuration of the information processing apparatus 100 according to the present example embodiment. The information processing apparatus 100 includes a display control unit 100A, an operation receiving unit 100B, and a processing request unit 100C. The display control unit 100A displays, on a screen, a map of a search area, a camera icon indicating a location of a surveillance camera in the map, and a person image of a search target person. The operation receiving unit 100B receives an operation of superimposing, on the screen, one of the person image or the camera icon on the other. The processing request unit 100C requests a matching process between the person image and a surveillance video captured by the surveillance camera corresponding to the camera icon based on the operation. According to the present example embodiment, the user is allowed to easily search a target person from a surveillance video captured by a desired surveillance camera.

Modified Example Embodiment

Although the disclosure has been described above with reference to the example embodiments, the disclosure is not limited to the example embodiments described above. Various modifications that may be understood by those skilled in the art can be made to the configuration and details of the disclosure within the scope not departing from the spirit of the disclosure. For example, it should be understood that an example embodiment in which a part of the configuration of any of the example embodiments is added to another example embodiment or an example embodiment in which a part of the configuration of any of the example embodiments is replaced with a part of another example embodiment is also one of the example embodiments to which the disclosure may be applied.

Although the example embodiment described above has described a case where a face image is used as the biometric information, the biometric information used in the present invention is not limited to the face image. For example, the management server 20 may perform a matching process using other biometric information such as an iris image or an auricle image instead of a face image. The management server 20 may perform a matching process based on a combination of different kinds of biometric information.

Further, when a person is searched from a video, not only a face image but also information related to the carried article may be detected and stored in a database in association with the face image. As specific examples of the carried article, clothing, hats, shoes, bags, glasses, and various accessories are cited. Similarly, the age and gender of a person may be estimated by image analysis and stored in a database in association with the face image. The user terminal 10 may be configured to request the management server 20 for matching process based on a combination of the face image (person image) of the target person and the specification information. In this case, the user can search the target person by specifying at least one of information related to the carried article of the target person and attribute information such as the age and gender of the target person on the screen.

The arrangement of the present invention is also applicable to the search of articles. For example, attribute information such as a license plate, shape, size, and color of a vehicle may be detected from a video captured by the surveillance camera 30 using image analysis technology, and the attribute information may be stored in a database. Thus, the user can easily search the target vehicle from the video captured by the desired surveillance camera 30.

Further, the video captured by each surveillance camera 30 may be analyzed, and features such as a gait of each person obtained by the analysis may be stored in a database. When the target person is specified from a displayed video by the user operation, the gait of the target person is analyzed, and the target person can be searched by matching the analysis result with the gait of the detected person in the database. As described above, by using the gait certification technology, there is an advantage in which the target person can be searched even when the target person is wearing a mask or sunglasses.

In the first example embodiment described above, the case where the user selects one face image from the detected person list has been described. However, the user terminal 10 may further include a function allowing the user to perform a drag operation for superimposing a plurality of face images selected from the detected person list on one camera icon.

When a plurality of target persons specified by the user operation are simultaneously captured by the surveillance camera 30 related to the destination in the drag operation, the management server 20 can extract a desired video scene and output it to the user terminal 10. For example, when a person X and a person Y are specified, a video in which two persons are simultaneously captured can be searched.

Similarly, when at least one of the plurality of target persons specified by the user operation is captured by the surveillance camera 30 as the destination in the drag operation, the management server 20 can extract a video scene related to the target person and output it to the user terminal 10.

In the first example embodiment described above, the configuration in which the user terminal 10 presents the detected person list distributed from the management server 20 to the user has been described. The management server 20 may further include a configuration in which a face image suitable for search (face matching) is automatically selected from the surveillance videos and outputted to the user terminal 10 as, for example, a detected person list. Specifically, a face image in which the detected person faces the surveillance camera 30 may be selected and included in the detected person list. Thus, the accuracy of subsequent matching process performed as the target person can be improved.

In the example embodiment described above, a case has been described in which a video of the surveillance camera 30 disposed in an outdoor search area is collected and the target person is searched from the video. But the search area is not limited to the outdoors. For example, indoor facilities such as transportation facilities and commercial facilities can be set as the search area. In this case, a guide map for each floor may be displayed as search area. For example, when the present invention is applied to a tracking operation of a person in a building consisting of a plurality of floors, the positional relationship between the target person and the surveillance camera 30 and the guide map may be displayed not only in two dimensions but also in three dimensions on a search screen and the like.

In the case of example embodiment described above, the management server 20 includes databases such as the video information database 22, and matching process and search process are performed in the server. However, each of the surveillance cameras 30 may play a part of the process of the management server 20.

Figure 38:
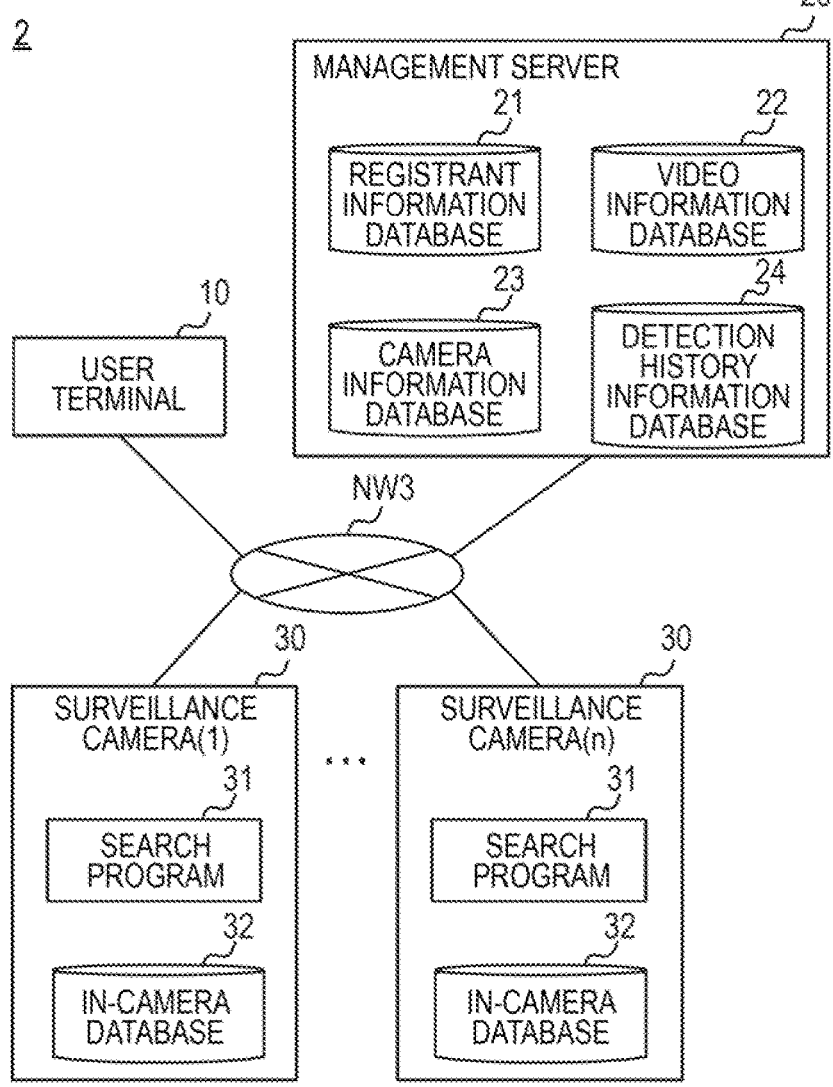
FIG. 38 is a block diagram illustrating an example of the overall configuration of a person search system according to a modified example embodiment.

FIG. 38 is a block diagram illustrating an example of the overall configuration of the person search system 2 in the modified example embodiment. Here, the user terminal 10, the management server 20, and a plurality of surveillance cameras 30 are connected via a network NW3 such as the Internet. Each of the plurality of surveillance cameras 30 includes a search program 31 and an in-camera database 32. The search program 31 is a program for searching a person matching the face image specified by the user terminal 10 from the captured images captured by the user terminal 10 in response to a search request from the user terminal. The in-camera database 32 is a database for storing data synchronized with, for example, the video information database 22 and the detection history information database 24 of the management server 20. An in-camera database 32 stores and stores captured images captured by the camera itself.

When the user performs an operation of dragging a person image or a face image on a camera icon on a map, the user terminal 10 sends a search request directly, or indirectly via a management server 20 to a surveillance camera 30 corresponding to the camera icon. The search request is search instruction information including a person image and the like dragged by the user. When receiving a search request from the user terminal 10, the surveillance camera 30 performs search process of the in-camera database 32 and returns the search results to the user terminal 10. In this case, since the plurality of surveillance cameras 30 performs the search process in a distributed manner, there is an advantage that the processing load of the management server 20 can be reduced.

Although the example embodiment described above has described a case in which a camera icon and the like are specified by the drag operation using the mouse pointer, the drag operation using the mouse pointer is only one example of the specifying operation. For example, the user may perform the specifying operation by swiping or tapping with a finger instead of the mouse pointer.

In the fifth example embodiment described above, for example, a case has been described in which the first camera icon corresponding to the first camera is dragged to the second camera icon corresponding to the second camera in order to search for persons (common persons) captured by both the first camera and the second camera in common. However, the operation for specifying a plurality of camera icons is not limited to this.

Figures 39, 40:
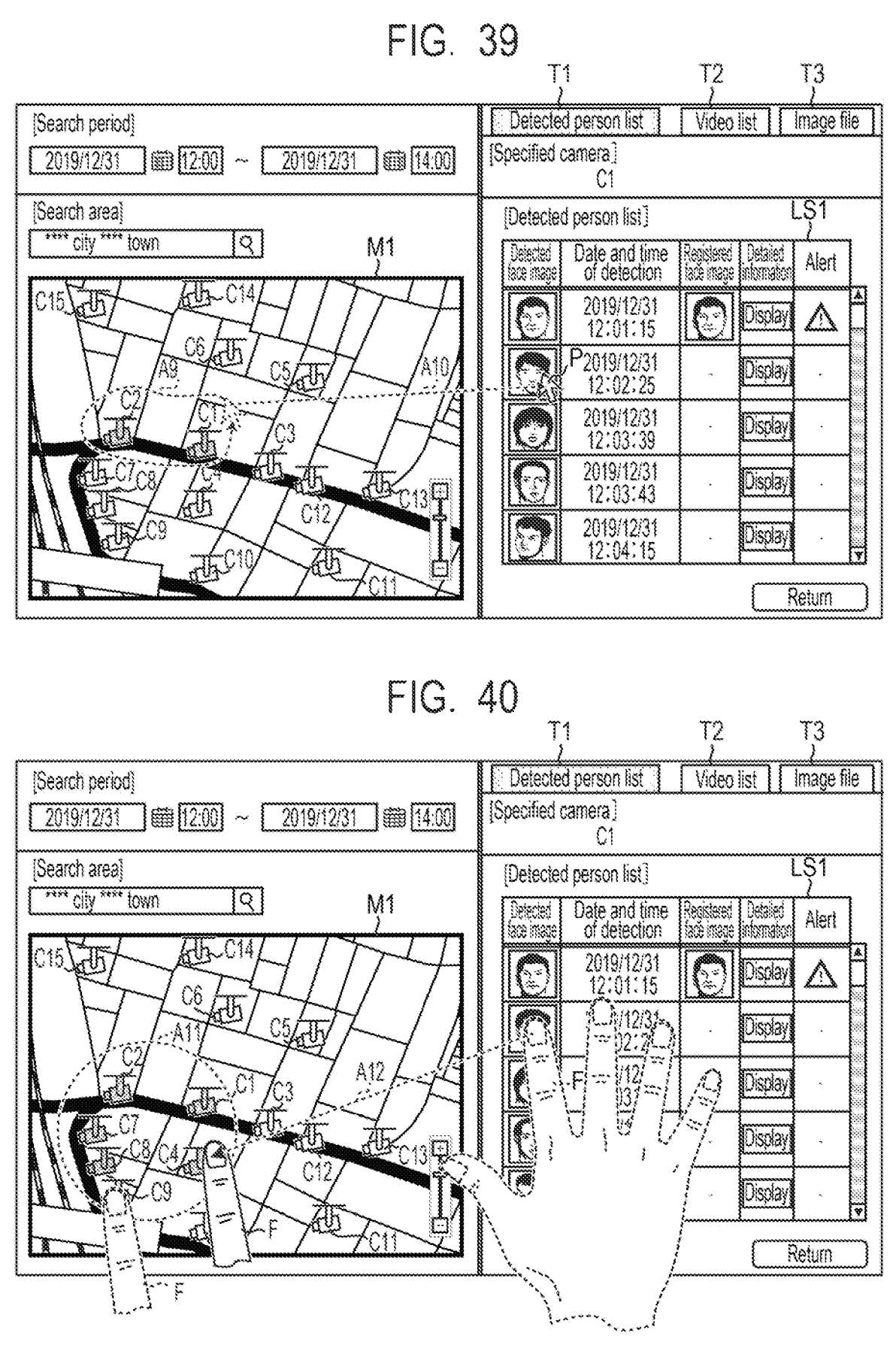

FIGS. 39 and 40 are diagrams illustrating an example of a search screen in the modified example embodiment. A broken line arrow A9 in FIG. 39 indicates that the user performs an operation for surrounding the camera icon C1 (first camera icon) and the camera icon C2 (second camera icon) with the trajectory of the mouse pointer P so as to include two camera icons. A broken line arrow A10 indicates an operation in which the user drags the camera icon group (or the area near the camera icon group) specified by the operation of the broken line arrow A9 related to the face image of the detected person list LS1.

A broken line arrow A11 in FIG. 40 indicates an operation in which the user specifies the surveillance camera 30 to be searched by tracing around a plurality of camera icons (C1, C2, C4, C7-C9) with a finger F. A broken line arrow A12 indicates an operation for dragging the face image of the detected person list LS1 to the camera icon group specified by the operation of the broken line arrow A11. Similarly, the user may specify the surveillance camera 30 to be searched by clicking a plurality of camera icons with the mouse pointer P or tapping with the finger F, and after the specifying operation, may perform an operation for dragging a person image to the camera icon group (or the area near the camera icon group). In either case, as in the case of the fifth example embodiment, it is possible to search for a person who is captured in common by all of the surveillance cameras 30 to be searched. The number of camera icons to be specified as the search target is not limited, and may be three or more.

The scope of each of the example embodiments also includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the program described above is stored but also the individual program itself.

As the storage medium, for example, a floppy (registered trademark) disk, a hard disk, an optical disk, a magneto-optical disk, a CD-ROM, a magnetic tape, a nonvolatile memory card, or the like can be used. Further, the scope of each of the example embodiments also includes an example that operates on OS to perform a process in cooperation with another software or a function of an add-in board without being limited to an example that performs a process by an individual program stored in the storage medium.

The whole or part of the example embodiments disclosed above can be described as, but not limited to, the following supplementary notes.

(Supplementary Note 1)

An information processing apparatus comprising:
a display control unit that displays, on a screen, a map of a search area, a camera icon indicating a location of a surveillance camera in the map, and a person image of a search target person;
an operation receiving unit that receives an operation of superimposing, on the screen, one of the person image or the camera icon on the other; and
a processing request unit that requests a matching process between the person image and a surveillance video captured by the surveillance camera corresponding to the camera icon based on the operation.

(Supplementary Note 2)

The information processing apparatus according to supplementary note 1,
wherein the display control unit displays an extracted video, among the surveillance video, which shows a person whose matching result with the person image is successful.

(Supplementary Note 3)

The information processing apparatus according to supplementary note 2, wherein the operation receiving unit receives an operation of superimposing, on the camera icon on the map, a specified person image related to the person specified in the extracted video; and wherein the processing request unit requests another matching process between the specified person image and the surveillance video captured by the surveillance camera corresponding to the camera icon.

(Supplementary Note 4)

The information processing apparatus according to supplementary note 2 or 3, wherein the operation receiving unit receives an operation of simultaneously superimposing the person image on a plurality of the camera icons superimposed and displayed on the map; and wherein the processing request unit collectively requests matching processes between the person image and the surveillance videos captured by the surveillance cameras corresponding to each of the plurality of the camera icons.

(Supplementary Note 5)

The information processing apparatus according to supplementary note 4, wherein the display control unit changes a display format of the camera icon in response to the result of the matching process for each of the surveillance cameras.

(Supplementary Note 6)

The information processing apparatus according to any one of supplementary notes 2 to 5, wherein the operation receiving unit receives an operation of superimposing, on the camera icon on the map, the person images related to a plurality of the specified search target persons on the camera icon; and wherein the processing request unit collectively requests matching processes between each of the plurality of the person images and the surveillance video captured by the surveillance camera corresponding to the camera icon.

(Supplementary Note 7)

The information processing apparatus according to supplementary note 6, wherein the display control unit displays the extracted video which shows at least one of the plurality of the specified search target persons, among the surveillance video related to the camera icon on which the person images are superimposed.

(Supplementary Note 8)

The information processing apparatus according to supplementary note 6, wherein the display control unit displays the extracted video which shows all of the specified search target person together, among the surveillance video related to the camera icon on which the person images are superimposed.

(Supplementary Note 9)

The information processing apparatus according to any one of supplementary notes 1 to 8, wherein the processing request unit determines, based on the capturing time of the person image, position information of a first camera that captured the person image, and position information of a second camera corresponding to the camera icon on which the person image is superimposed, a time range for executing a matching process between the person image and the surveillance video captured by the second camera.

(Supplementary Note 10)

The information processing apparatus according to any one of supplementary notes 1 to 8, wherein the processing request unit determines, based on the capturing time of the person image, a moving speed of the search target person calculated using the person image, position information of a first camera that captured the person image, and position information of the second camera corresponding to the camera icon on which the person image is superimposed, a time range for executing a matching process between the person image and the surveillance video captured by the second camera.

(Supplementary Note 11)

The information processing apparatus according to any one of supplementary notes 2 to 8, wherein the display control unit superimposes and displays, on the extracted video, a sign indicating the direction of the location of another surveillance camera that is different from the surveillance camera related to the extracted video.

(Supplementary Note 12)

The information processing apparatus according to supplementary note 11, wherein the display control unit superimposes and displays, on the extracted video, identification information of the surveillance camera positioned in the direction in which the person whose result of the matching process is successful proceeds.

(Supplementary Note 13)

The information processing apparatus according to any one of supplementary notes 1 to 12, wherein the display control unit highlights the camera icon corresponding to the surveillance camera positioned in the direction in which the person whose result of the matching process is successful proceeds.

(Supplementary Note 14)

The information processing apparatus according to any one of supplementary notes 1 to 13, wherein the operation receiving unit receives specified information related to at least one of clothes, articles to be carried, age, gender and gait of the search target person, wherein the processing request unit requests the matching process based on a combination of the person image and the specified information.

(Supplementary Note 15)

The information processing apparatus according to any one of supplementary notes 1 to 14, wherein the display control unit displays, on the screen, the surveillance video captured by the surveillance camera corresponding to the camera icon displayed on the map, wherein the operation receiving unit receives an operation of superimposing the person image of the search target person included in the surveillance video and the camera icon displayed on the map.

(Supplementary Note 16)

The information processing apparatus according to any one of supplementary notes 1 to 15, wherein the display, on the screen, control unit displays the image file requested to be read, wherein the operation receiving unit receives an operation of superimposing the person image of the search target person included in the displayed image file and the camera icon displayed on the map.

(Supplementary Note 17)

The information processing apparatus according to any one of supplementary notes 1 to 16,
wherein the display control unit displays, on the screen, a person image list of persons shown in the surveillance video captured by the surveillance camera corresponding to the camera icon that is specified on the map,
wherein the operation receiving unit receives an operation of superimposing the specified person image specified from the person image list and the camera icon displayed on the map.

(Supplementary Note 18)

An information processing method comprising:
displaying, on a screen, a map of a search area, a camera icon indicating a location of a surveillance camera in the map, and a person image of a search target person;
receiving an operation of superimposing, on the screen, one of the person image or the camera icon on the other; and
requesting a matching process between the person image and a surveillance video captured by the surveillance camera corresponding to the camera icon based on the operation.

(Supplementary Note 19)

A storage medium storing a program that causes a computer to execute:
displaying, on a screen, a map of a search area, a camera icon indicating a location of a surveillance camera in the map, and a person image of a search target person;
receiving an operation of superimposing, on the screen, one of the person image or the camera icon on the other; and
requesting a matching process between the person image and a surveillance video captured by the surveillance camera corresponding to the camera icon based on the operation.

REFERENCE SIGNS LIST

NW1, NW2, NW3 Network
1,2 . . . Person Search System
10 . . . User terminal
20 . . . Management Server
21 . . . Registrant information database
22 . . . Video information database
23 . . . Camera information database
24 . . . Detection history information database
30 . . . Surveillance cameras
31 . . . Search Program
32 . . . In-camera database
100 . . . Information processing apparatus
100A . . . Display Control unit
100B . . . Operation receiving unit
100C . . . Processing request unit

What is claimed is:

1. An information processing apparatus comprising:
at least one memory storing instructions; and
at least one processor configured to execute the instructions to:
display at least a map of a search area and one camera icon on a screen, the at least one camera icon corresponding to at least one camera and indicating a location of the at least one camera on the map;
display at least one person image on the screen, the at least one person image showing at least one person;
receive an operation to superimpose one of the at least one person image or the at least one camera icon on the other;
request a first matching process based on the operation to superimpose one of the at least one person image or the at least one camera icon on the other, the first matching process matching between the at least one person image and the at least one video captured by the at least one camera;
receive an operation to superimpose a specified person image on a camera icon displayed on the screen which is different from the at least one camera icon, the specified person image showing a person who is specified from an extracted video; and
request a second matching process based on the operation to superimpose the specified person image on the camera icon displayed on the screen, the second matching process matching between the specified person image and a video captured by a camera corresponding to the camera icon.

2. The information processing apparatus according to claim 1, wherein the at least one processor further is configured to execute the instructions to:
display the extracted video on the screen, the extracted video showing the at least one person and extracted from the at least one video.

3. The information processing apparatus according to claim 1,
wherein the at least one camera icon comprises a plurality of camera icons; wherein the at least one camera comprises a plurality of cameras, the plurality of the cameras corresponding to the plurality of the camera icons;
wherein the at least one video comprises a plurality of videos, each of the plurality of the videos captured by each of the plurality of the cameras; and
wherein the at least one processor further is configured to execute the instructions to:
receive an operation to superimpose collectively the at least one person image on the plurality of the camera icons; and
request third matching process based on the operation to superimpose collectively the at least one person image on the plurality of the camera icons, the third matching process matching between the at least one person image and each of the plurality of the videos.

4. The information processing apparatus according to claim 3, wherein the at least one processor further is configured to execute the instructions to:
change the plurality of the camera icons in response to the third matching process.

5. The information processing apparatus according to claim 1,
wherein the at least one person comprises a plurality of persons searched by the first search process;
wherein the at least one person image comprises a plurality of person images, each of the plurality of the person images showing each of the plurality of the persons; and
wherein the at least one processor further is configured to execute the instructions to:
receive an operation to superimpose collectively the plurality of the person images on the at least one camera icon; and
request fourth matching process based on the operation to superimpose collectively the plurality of the person images on the at least one camera icon, the fourth matching process matching between each of the plurality of the person images and the at least one video.

6. The information processing apparatus according to claim 5, wherein the at least one processor further is configured to execute the instructions to:
display an extracted video on the screen, the extracted video showing at least one person who matched by the fourth matching process.

7. The information processing apparatus according to claim 5, wherein the at least one processor further is configured to execute the instructions to:
display an extracted video on the screen, the extracted video simultaneously showing all of persons who matched by the fourth matching process.

8. The information processing apparatus according to claim 1, wherein the at least one processor further is configured to execute the instructions to:
determine a period for the first matching process based on a time capturing the at least one person, position information of a camera capturing the at least one person, and position information of the at least one camera, the position information of the camera being different from the position information of the at least one camera.

9. The information processing apparatus according to claim 8,
wherein the instructions to determine the period for the first matching process determine the period for the first matching process based on a speed of the at least one person.

10. The information processing apparatus according to claim 2, wherein the at least one processor further is configured to execute the instructions to:
display a sign on the extracted video, the sign indicating a direction to a location located in a camera which is different from the at least one camera corresponding to the extracted video.

11. The information processing apparatus according to claim 2, wherein the at least one processor further is configured to execute the instructions to:
display identification information on the extracted video, the identification information corresponding to a camera located in a direction in which the at least one person proceeds.

12. The information processing apparatus according to claim 1, wherein the at least one processor further is configured to execute the instructions to:
highlight a camera icon corresponding to a camera located in a direction in which the at least one person proceeds.

13. The information processing apparatus according to claim 1, wherein the at least one processor further is configured to execute the instructions to:
receive specified information related to at least one of clothes of the at least one person, articles to be carried by the at least one person, age of the at least one person, gender of the at least one person or gait of the at least one person;
wherein the instructions to request a first matching process based on the operation to superimpose one of the at least one person image or the at least one camera icon on the other request the first matching process based on the specified information and the at least one person image.

14. The information processing apparatus according to claim 1,
wherein the instructions to display at least one person image on the screen include to display a video showing the at least one person on the screen, the video captured by a camera, the camera corresponding to a camera icon displayed on the screen, the camera icon being different from the at least one camera icon; and
wherein the at least one person image is obtained from the video displayed on the screen.

15. The information processing apparatus according to claim 1,
wherein the instructions to display at least one person image on the screen include to display, on the screen, at least one of a still image stored or a moving image stored; and
wherein the at least one person image is obtained from the at least one of a still image or a moving image displayed on the screen.

16. The information processing apparatus according to claim 15,
wherein the instructions to display at least one person image on the screen include to display a list on the screen, the list showing the at least one person image, the at least one person image extracted from a video, the video captured by a camera, the camera corresponding to a camera icon displayed on the screen, the camera icon being different from the at least one camera icon.

17. An information processing method performed by a computer and comprising:
displaying at least a map of a search area and one camera icon on a screen, the at least one camera icon corresponding to at least one camera and indicating a location of the at least one camera in the map,
displaying at least one person image on the screen, the at least one person image showing at least one person;
receiving an operation to superimpose one of the at least one person image or the at least one camera icon on the other;
requesting a first matching process based on the operation to superimpose one of the at least one person image or the at least one camera icon on the other, the first matching process matching between the at least one person image and the at least one video captured by the at least one camera;
receiving an operation to superimpose a specified person image on a camera icon displayed on the screen which is different from the at least one camera icon, the specified person image showing a person who is specified from the extracted video; and
requesting a second matching process based on the operation to superimpose the specified person image on the camera icon displayed on the screen, the second matching process matching between the specified person image and a video captured by a camera corresponding to the camera icon.

18. A non-transitory storage medium storing a program executable by a computer to perform processing comprising:
displaying at least a map of a search area and one camera icon on a screen, the at least one camera icon corresponding to at least one camera and indicating a location of the at least one camera in the map,
displaying at least a map of a search area and one person image on the screen, the at least one person image showing at least one person;
receiving an operation to superimpose one of the at least one person image or the at least one camera icon on the other;
requesting a first matching process based on the operation to superimpose one of the at least one person image or the at least one camera icon on the other, the first matching process matching between the at least one person image and the at least one video captured by the at least one camera;

receiving an operation to superimpose a specified person image on a camera icon displayed on the screen which is different from the at least one camera icon, the specified person image showing a person who is specified from the extracted video; and requesting a second matching process based on the operation to superimpose the specified person image on the camera icon displayed on the screen, the second matching process matching between the specified person image and a video captured by a camera corresponding to the camera icon.

* * * * *